(12) United States Patent
Davidi et al.

(10) Patent No.: US 11,612,145 B1
(45) Date of Patent: Mar. 28, 2023

(54) TRACKING AND MONITORING BEES POLLINATION EFFICIENCY

(71) Applicant: BeeHero Ltd., Tel-Aviv (IL)

(72) Inventors: Omer Davidi, Sde Warburg (IL); Itai Kanot, Avigdor (IL); Gordon Cameron Clouston, Wigton (GB)

(73) Assignee: BeeHero Ltd., Tel-Aviv (IL)

( * ) Notice: Subject to any disclaimer, the term of this patent is extended or adjusted under 35 U.S.C. 154(b) by 0 days.

(21) Appl. No.: 17/742,423

(22) Filed: May 12, 2022

(51) Int. Cl.
| | |
|---|---|
| *G06K 9/00* | (2022.01) |
| *A01K 29/00* | (2006.01) |
| *A01K 47/06* | (2006.01) |
| *G06V 10/70* | (2022.01) |
| *G06V 20/52* | (2022.01) |

(52) U.S. Cl.
CPC ............ *A01K 29/005* (2013.01); *A01K 47/06* (2013.01); *G06V 10/70* (2022.01); *G06V 20/52* (2022.01)

(58) Field of Classification Search
CPC ...... A01K 29/005; A01K 47/06; G06V 10/70; G06V 20/52
See application file for complete search history.

(56) References Cited

U.S. PATENT DOCUMENTS

| | | | |
|---|---|---|---|
| 10,064,395 B2* | 9/2018 | Chapa | G01J 1/42 |
| 10,721,919 B2* | 7/2020 | Wilson-Rich | G08B 23/00 |
| 2017/0071169 A1* | 3/2017 | Benedetti | A01K 47/06 |
| 2020/0267945 A1* | 8/2020 | Symes | A01K 47/06 |
| 2021/0000083 A1* | 1/2021 | Temby | G06V 20/53 |
| 2022/0237481 A1* | 7/2022 | Jones | G06N 5/04 |

* cited by examiner

*Primary Examiner* — Tom Y Lu

(57) ABSTRACT

There is provided a computer implemented method of training a machine learning model, comprising: computing at least one in-colony feature indicative of an internal state of a sample honeybee colony positioned for pollination of at least one crop in a geographical area, from output of at least one internal sensor monitoring the honeybee colony, computing at least one out-colony feature indicative of an external environment of the sample honeybee colony, from output of at least one external sensor monitoring the environment of the honeybee colony, creating a multi-record training dataset, wherein a record comprises: a combination of at least one in-colony feature and at least one out-colony feature, and a ground truth label indicating pollination effectiveness of the sample honeybee colony, and training a machine learning model on the multi-record training dataset.

26 Claims, 9 Drawing Sheets

| Company | Hive Sensors/Data collected | Analytics | Market | Pollination Models |
|---|---|---|---|---|
| A | Temp, weight, sound, humid, weather | Raw Data | Hobby | X |
| B | Temp, humid, sound, | Raw data | Hobby | X |
| C | Temp, humid, weight, sound | Raw data | Hobby + commercial | X |
| D | Temp, humid, weight accelerometer | Raw data + limited AI | Hobby + sideliner | X |
| E | Temp, humid, weight, weather | Raw data + limited AI | Hobby | X |
| F | Temp & Humidity | Raw data | Hobby | X |
| G | Weight & Temp | Raw data | Hobby + Sideliner | X |
| H | Weight, temp, humid, sound | Raw data | Hobby + sideliner | X |
| I | Temp, humid, weight | Raw data | Hobby + sideliner | X |
| J | Temp & Sound | Raw data + AI (sound) | Hobby | X |
| K | Temp, Humid, Sound, Weight | Raw data + AI | Hobby + commercial | X |
| L | Temp, Sound, still in dev | AI | Commercial | X |
| M | Vision/camera system | Vision analysis | Hobby + research | X |
| N | Temp, Weight | Raw Data | | X |
| O | Weight, temp, humid, sound | Raw Data + AI | Hobby + Commercial | X |

TRACKING AND MONITORING BEES POLLINATION EFFICIENCY

FIELD AND BACKGROUND OF THE INVENTION

The present invention, in some embodiments thereof, relates to beekeeping and, more specifically, but not exclusively, to systems and methods for management of bee colonies for pollination of crop.

About 75% of the world's food crops rely on insect pollination; the pollination services they provide are vital for world food production.

SUMMARY OF THE INVENTION

According to a first aspect, a computer implemented method of training a machine learning model, comprises: computing at least one in-colony feature indicative of an internal state of a sample honeybee colony positioned for pollination of at least one crop in a geographical area, from output of at least one internal sensor monitoring the honeybee colony, computing at least one out-colony feature indicative of an external environment of the sample honeybee colony, from output of at least one external sensor monitoring the environment of the honeybee colony, creating a multi-record training dataset, wherein a record comprises: a combination of at least one in-colony feature and at least one out-colony feature, and a ground truth label indicating pollination effectiveness of the sample honeybee colony, and training a machine learning model on the multi-record training dataset.

According to a second aspect, a computer implemented method of managing honeybee colonies for pollination of at least one crop, comprises: for each one of a plurality of honeybee colonies positioned for pollination of at least one crop in a geographical area: obtaining at least one in-colony feature indicative of an internal state of the honeybee colony, computed from output of at least one internal sensor monitoring the honeybee colony, obtaining at least one out-colony feature indicative of an external environment of the honeybee colony, computed from output of at least one external sensor monitoring the environment of the honeybee colony, feeding a combination of the at least one in-colony feature and the at least one out-colony feature into a machine learning model trained according to claim 1, and obtaining an outcome indicating pollination effectiveness of the sample honeybee colony.

According to a third aspect, a system for training a machine learning model, comprises: at least one processor executing a code for: computing at least one in-colony feature indicative of an internal state of a sample honeybee colony positioned for pollination of at least one crop in a geographical area, from output of at least one internal sensor monitoring the honeybee colony, computing at least one out-colony feature indicative of an external environment of the sample honeybee colony, from output of at least one external sensor monitoring the environment of the honeybee colony, creating a multi-record training dataset, wherein a record comprises: a combination of at least one in-colony feature and at least one out-colony feature, and a ground truth label indicating pollination effectiveness of the sample honeybee colony, and training a machine learning model on the multi-record training dataset.

In a further implementation form of the first, second, and third aspects, the ground truth label comprises of a number of honeybees for delivery to the at least one crop for pollination thereof.

In a further implementation form of the first, second, and third aspects, the ground truth label comprises a pollination efficiency of the sample honeybee colony.

In a further implementation form of the first, second, and third aspects, the ground truth label comprises an indication of health of at least one hive that houses the sample honeybee colony.

In a further implementation form of the first, second, and third aspects, the ground truth label comprises a status of a queen of the sample honeybee colony.

In a further implementation form of the first, second, and third aspects, the ground truth label comprises an amount of brood.

In a further implementation form of the first, second, and third aspects, the ground truth label comprises honeybee foraging activity determined according to forage available for crop pollination around a hive of the sample honeybee colony.

In a further implementation form of the first, second, and third aspects, the forage available for crop pollination comprises a proportion of the at least one crop at a stage of crop bloom and/or a percentage of the at least one crop at crop bloom, wherein crop bloom comprises crop which is flowering and/or producing nectar and/or producing pollen.

In a further implementation form of the first, second, and third aspects, the proportion of the at least one crop at a stage of crop bloom and/or a percentage of the at least one crop at crop bloom is computed by an image processing process that is fed images of the at least one crop captured by at least one camera.

In a further implementation form of the first, second, and third aspects, further comprising creating a plurality of multi-record training datasets, each multi-record training dataset includes a different set of records, wherein the machine learning model comprises an ensemble of machine learning models, and training comprises training the ensemble of machine learning models on the plurality of multi-record training datasets, and further comprising assigning weights to a plurality of outcomes of the ensemble of machine learning models, and providing an aggregation model that receives the weighted plurality of outcomes as input and generates a final prediction.

In a further implementation form of the first, second, and third aspects, the ensemble of machine learning models generate outcomes selected from a group comprising: (i) bee frames indicating hive strength as expressed by a number of bee frames and/or an indication of growing and/or declining number, (ii) a number of brood frames and/or an indication of growing and/or declining number, (iii) queen status indicating presence of a laying queen in the colony, (iv) health status indicating presence of disease and/or infection and/or infestation, (v) pollination input indicating optimum number of bees and/or bee frames for pollinating the at least one crop, (vi) foraging force indicating total number of foraging trips delivered by the honeybee colony to the at least one crop, (vii) foraging rate indicating number of bees leaving the hive per time interval, (viii) pollination efficiency indicating proportion of the at least one crop successfully pollinated, and (ix) yield prediction indicating estimated nut/fruit set and/or yield.

In a further implementation form of the first, second, and third aspects, the output of at least one internal sensor is selected from a group comprising: colony acoustics, brood temperature, and brood humidity.

In a further implementation form of the first, second, and third aspects, at least one external sensor is selected from a group comprising: camera, weather station, satellite image sensor, and data feeds.

In a further implementation form of the first, second, and third aspects, the at least one in-colony feature of the honeybee colony is selected from group consisting of: colony strength, colony status, colony foraging activity, colony size, demography, presence of queen, brood status, brood temperature, brood variation, colony acoustics, acoustic frequency spectrum, acoustic noise/power, and hive orientation.

In a further implementation form of the first, second, and third aspects, the at least one out-colony feature is selected from group consisting of: weather conditions, ambient temperature, ambient variation, crop density, crop variety, crop yield, forage availability, forage bloom, cover crops, field size, real time blood progress, forage availability, crop variety, temperature, wind speed, wind direction, rainfall, air pressure, ultraviolet (UV) light, and cloud cover.

In a further implementation form of the first, second, and third aspects, the combination of the record includes at least one other feature obtained from a non-sensor source, selected from a group comprising: data entered by a user via a user interface, agricultural data, and queen lines.

In a further implementation form of the first, second, and third aspects, further monitoring the output of the at least one external sensor and/or the output of the at least one internal sensor over a time interval to obtain a plurality of values, and computing the at least one in-colony feature and/or the at least one out-colony feature as statistical features of the plurality of values.

In a further implementation form of the first, second, and third aspects, the at least one internal sensor comprises: circuitry for wireless communication, an on-board power supply, at least one of: a temperature sensor for measuring temperature, a humidity sensor for measuring humidity, a stereo microphone for measuring colony acoustics, and a location sensor for sensing a location thereof, and a connector for connecting to a bee frame.

In a further implementation form of the first, second, and third aspects, a plurality of internal sensors disposed within a plurality of bee frames are in wireless communication with a gateway in communication with a server.

In a further implementation form of the first, second, and third aspects, the at least one internal sensor comprises a weather station disposed within an apiary that includes the hive of the sample honeybee colony, that monitors microclimate within and/or in proximity to the apiary, selected from a group comprising: temperature, wind speed, wind direction, and rainfall.

In a further implementation form of the first, second, and third aspects, the machine learning model comprises an ensemble of machine learning models, and further comprising creating a plurality of combinations, feeding the plurality of combinations into the ensemble to obtain a plurality of outcomes, assigning weights to the plurality of outcomes, feeding the weighted plurality of outcomes into an aggregation model that generates the outcome as a final prediction.

In a further implementation form of the first, second, and third aspects, the features of the method are iterated in near real time over a plurality of time intervals.

In a further implementation form of the first, second, and third aspects, wherein the pollination effectiveness comprises a predicted number of honeybees for delivery to the at least one crop for pollination thereof, and further comprising computing a current number of honeybees, and automatically generating instructions for ordering an additional number of honeybees for obtaining the current number when the current number is below the predicted number.

In a further implementation form of the first, second, and third aspects, further comprising analyzing the combination of the at least one in-colony feature and the at least one out-colony feature to identify whether an internal state has unexpectedly changed of a member of a group comprising: a hive relative to itself, a hive relative to other hives in the geographical location, and a hive relative to other hives in other geographical locations of a region.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a table summarizing some existing hive monitoring systems available for different companies, to help understand some embodiments of the present invention;

Figure 2:
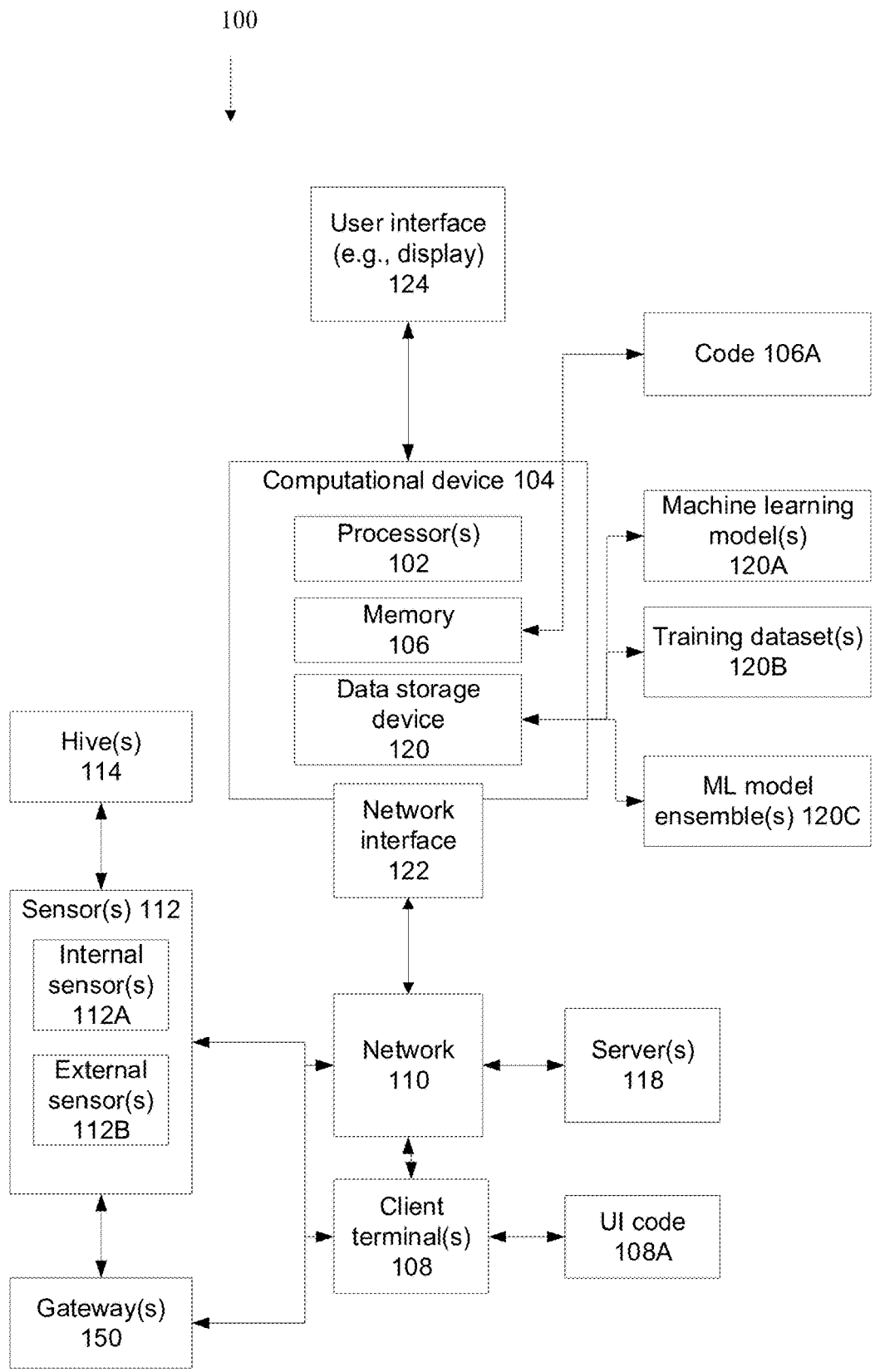
FIG. 2 is a block diagram of a system for training one or more ML models and/or for inference by the trained ML model(s) for generating an outcome indicative of pollination effectiveness of a honeybee colony, in accordance with some embodiments of the present invention.

DESCRIPTION OF SPECIFIC EMBODIMENTS
OF THE INVENTION

The present invention, in some embodiments thereof, relates to beekeeping and, more specifically, but not exclusively, to systems and methods for management of bee colonies for pollination of crop.

An aspect of some embodiments of the present invention relates to systems, methods, computing devices, and/or code instructions (stored on a data storage device, executable to one or more hardware processors) for training a machine learning (ML) model for generating an outcome indicative of pollination effectiveness of a target honeybee colony positioned for pollination of a target crop in a geographical area, for example, bee hives positioned within or in proximity to an orchard of almond trees for pollination of the blossoms. A multi-record training dataset is created. Each record includes a combination of one or more in-colony features and/or one or more out-colony feature of a sample honeybee colony, and a ground truth label indicating pollination effectiveness of the sample honeybee colony. The in-colony features are indicative of an internal state of the sample honeybee colony. The in-colony features may be computed from output of one or more internal sensors that monitor the honeybee colony. The out-colony features are indicative of an external environment of the sample honeybee colony. The out-colony features may be computed from output of one or more external sensors monitoring the environment of the honeybee colony. The ML model is trained on the multi-record training dataset.

An aspect of some embodiments of the present invention relates to systems, methods, computing devices, and/or code instructions (stored on a data storage device, executable to one or more hardware processors) for managing a target honeybee colony for pollination of a target crop, based on an outcome indicative of pollination effectiveness of the target honeybee colony positioned for pollination of the target crop obtained from a trained ML model. Output of one or more internal sensors monitoring the honeybee colony is obtained. One or more in-colony features indicative of an internal state of the target honeybee colony are computed based on the output of the internal sensor(s). Output of one or more external sensors monitoring the environment of the target honeybee colony is obtained. One or more out-colony features indicative of an external environment of the target honeybee colony are computed based on the output of the external sensor(s). A combination of the in-colony feature(s) and/or the out-colony feature(s) are fed into the trained ML model(s). The outcome indicating pollination effectiveness of the sample honeybee colony is obtained from the ML model(s). One or more actions for managing the target honeybee colony may be taken based on the pollination effectiveness, for example, increasing the pollination effectiveness. Exemplary actions include: increasing the number of available honeybees, treating a disease outbreak in the honeybee colony, and replacing a queen bee where another queen bee died.

At least some implementations of the systems, methods, devices, and/or code instructions (e.g., stored on a memory and executable by processor(s)) described herein address the technical problem of management of bee colonies for pollination of crop, for example, for optimizing yield of the crop. At least some implementations of the systems, methods, devices, and/or code instructions described herein improve the technology of management of bee colonies for pollination of crop, for example, for optimizing yield of the crop.

Until the late 20th century, pollination was provided for free as an ecosystem service by honeybees and wild bee pollinators. However, over the last 50 years there has been a 300% increase in the production of pollinator-dependent crops. This period has also seen the intensification of agriculture with large areas of land dedicated to a single crop, which requires more pollinating bees during crop bloom than is available naturally. The situation is made worse by declines in diversity and abundance of wild pollinators, which has led to increased demand for—and reliance upon—rented honeybee colonies that are placed into fields during flowering periods to pollinate a crop. However, honeybees have also suffered from increased mortality rates, weakening health, and productivity. This is stressing pollination capacity causing price increases for pollination services, while the strength of colonies is variable and pollination performance suboptimal.

At least some implementations of the systems, methods, devices, and/or code instructions described herein address the above mentioned technical problem, and/or improve the above mentioned technology by training an ML model ensemble and/or providing the trained ML model ensemble for computing a pollination effectiveness of honey bees. The pollination effectiveness depends on, for example, the number, spread, location, and/or strength of colonies deployed in the crop, which may be computed as outcomes of ML model(s) of the ML model ensemble, as described herein. Various in-colony and/or out-colony features that have an impact on foraging activity levels are computed from measurements made by internal sensors and/or external sensors. The in-colony and/or out-colony features are fed into the ML model ensemble. Examples of in-colony features include the colony size and demography, queen and brood status. Examples of out-of-colony features include weather conditions and forage availability. The dynamics of forage, weather conditions and the changes in colony foraging behavior may be the key determinants of the number of visits received by blossoms, and hence crop yield. The ML model ensemble described herein is trained and/or designed to generate outcomes for increasing visits of honeybees to blossoms for increasing crop yield.

At least some implementations of the systems, methods, devices, and/or code instructions described herein improve over existing approaches of management of honeybee colonies for pollination for crops. For example, standard approaches for assessment of colony strength are based on a one-off physical inspection of the strength of a small sample of hives following placement in the crop. This is done by physically opening the hives periodically to inspect the colonies to determine hive strength and health (e.g., estimate number of bees and brood frames, locate queen), periodically counting bees manually leaving the hive, and/or using a 'rule of thumb' estimate for placement of hives in a crop. However, there are several drawbacks to this approach:

Such approach is a subjective, time-consuming, and costly process that is disruptive to the bees. In contrast, at least some embodiments described herein use sensors for monitoring the bees, which provide object data, automated monitoring, cost effective, and/or non-disruptive to the bees. Features computed from the measurements made by the sensors are fed into the ML model ensemble.

Such approach does not provide a measure of the real pollination input delivered to a crop (e.g., number of bees). Such approach only provides an assessment of the strength of a small proportion of colonies delivered to a crop; the true pollination input is unknown. In contrast, at least some embodiments described herein provide an accurate measure of the pollination input delivered to the crop (e.g., number of bees). The true pollination input, for example, the strength of all colonies delivered to the crop, is accurate computed using the ML model ensemble described herein.

There is no direct measurement of the actual pollination effectiveness of the bees during the crop bloom period. Colony status and foraging activity can change dramatically over a short period of time and seriously impact crop yields and quality. In contrast, at least some embodiments described herein provide an accurate direct measurement of the actual pollination effectiveness of the bees during the crop bloom period. Real time changes in the colony status and/or foraging activity are monitored and/or detected in real time. The real time monitoring and/or detection enables taking quick actions to prevent serious impact on crop yield and/or quality.

Lack of precise data on the pollination input and effectiveness means that farmers are more inclined to stock high densities of hives, assuming that more bees are always better for crop yield. However, as well as being more expensive, stocking hives beyond an optimum level is not beneficial and may even be detrimental for crop productivity. Overstocking can also increase pressure on local wild pollinators and ecosystems and contribute to the spread of pathogens. In contrast, at least some embodiments described herein provide an accurate estimate of the number of bees (e.g., number of hives) that is most optimal for the target crop at the target field, which prevents overstocking and/or understocking.

At least some implementations of the systems, methods, devices, and/or code instructions described herein improve over other approaches that provide remote hive monitoring systems. However, such monitoring systems are primarily targeted at hobby beekeepers as an aid to bee husbandry. None of the currently available systems collect, analyze, or present data relevant to crop pollination by honey bees using the ML model ensemble descried herein. Moreover, no existing systems present data and/or insights specific to support pollination management decisions by users (e.g., farmers) based on the ML model ensemble descried herein. Examples of improvements of at least some implementations of the systems, methods, devices, and/or code instructions described herein over existing monitoring systems include:

Existing hive monitoring systems transmit raw data about the current status of the hive, which requires beekeepers to manually check the readings on each individual hive and manually interpret the data. Such solution may be suitable for hobby beekeepers with small numbers of hives, but impractical for commercial pollination beekeepers with many thousands of hives. At least some embodiments described herein may compute features from raw data collected by sensors, which are used to train the ML model ensemble and/or which are fed into the ML model ensemble. In at least some embodiments, the ML model ensemble is designed for use for automated monitoring of large number of hives of many different users.

Existing systems fail to provide actionable insights as to what the hive needs to perform better nor any measures related to hive strength and activity for crop pollination effectiveness. In contrast, at least some embodiments described herein provide such information.

In order to develop crop pollination models, data is also required on a range of external influential environmental and agronomic factors. None of the existing solutions have methods, systems or code designed to acquire, prepare for use, integrate, analyze, and/or model these types of data. In contrast, at least some embodiments described herein provide such services.

None of the existing solutions present data, metrics, insights, or predictive models for managed pollination services using honey bees. In contrast, at least some embodiments described herein provide such services.

At least some implementations of the systems, methods, devices, and/or code instructions described herein address the above mentioned technical problem(s), and/or improve the above mentioned technology, and/or improve over existing approaches, for example, by one or more of:

There are a myriad of intra- and extra-colony stimuli that impact bee pollination activity. In-Colony features include hive strength, amount of brood, queen status, and presence of disease or infestation. Out-colony features include weather, forage availability, crop variety and density of planting. The in-colony and/or out-colony features are computed and used to train the ML model ensemble and/or fed into the trained ML model ensemble.

Data analytics for any application requires a foundational database of raw data to be analyzed. With regard to honey bee pollination, such raw data does not exist. There are a range of factors and variables that impact honey bee pollination activity, crop yield, and quality. These data are fragmented across different sources or not collected at all. Embodiments described herein are designed to gather such raw data (e.g., via the sensors described herein) and/or compute features from the raw data which are used train the ML model ensemble and/or are fed into the trained ML model ensemble.

At least some embodiments described herein utilize specific data collection tools and/or technologies, such as in hive monitoring sensors, to generate some of the required raw data. In at least some embodiments, the ML model ensemble described herein is designed based a complex mix of entomology, agronomic, technical, and/or mathematical knowledge.

At least some embodiments described herein collect raw data needs by a variety of methods and/or from a variety of sources, using several different formats (e.g., sound files, images, spreadsheets, sensor readings, surveys).

At least some embodiments described herein are designed to handle large heterogeneous data sets, which create significant technical challenges for the development of robust machine learning models. Approach of feature engineering and/or model development for generating the ML model ensemble are described herein.

In at least some embodiments, the ML model ensemble described herein attempts to find relationships between a wide array of features and outcomes, for example, pollination efficacy. The precise relationships and correlations between these different features are learned by the ML model ensemble, as described herein.

Remote monitoring, as described herein, provides significant efficiency benefits for beekeepers, for example, reducing the number of yard visits and/or hive inspections otherwise required.

At least some embodiments described herein provide an outcome of the ML model ensemble for assessing the strength, health and/or status of the monitored hives, for example, for informing decisions about feeding, treatment, swarm management, queen replacement, and the like. This helps to reduce colony losses and enable beekeepers to build and maintain a secure supply of strong and healthy colonies for pollination services.

At least some embodiments described herein use the ML model ensemble for accurately quantifying the pollination needs of a particular crop/farm location and/or for delivering the optimum pollination input (e.g., number of bees as opposed to numbers of hives).

Examples of pollination inputs, which in at least some embodiments are obtained as an outcome of the ML model ensemble, are predicted to be Quality Assured in terms of the colony strength (e.g., number of bees) when delivered to a crop. The ML model ensemble may be used for providing visibility on the status of hives in the supply chain, for example, for reducing farmers' exposure to risks from unknown hive numbers and/or strengths.

At least some embodiments described herein provide a UI for users (e.g., farmers) for example, for tracking the progress of pollination in real-time on any part of the crop, identify areas and/or hives that are underperforming, assess the impact of weather, and/or for taking corrective action where needed.

At least some embodiments described herein provide a fully integrated, intelligent decision support system and/or model that enables the delivery of Precision Pollination Services to optimize crop yield and quality while enhancing honey bee health.

At least some implementations of the systems, methods, devices, and/or code instructions described herein provide real-time monitoring of honey bee foraging and/or pollination activity, for example, for providing data for enabling farmers on which to base their pollination management decisions, enabling productivity improvements. Beekeepers and/or crop growers are provided with approaches for monitoring actual pollination input and/or the effectiveness of pollination services in real-time. The assessment of impact on crop yield is done before it is already too late: much before the time to harvest, enabling generating a productive harvest rather than a poor harvest as would otherwise occur with standard approaches. Embodiments described herein provide yield-enhancing and/or data-driven pollination management services.

At least some implementations of the systems, methods, devices, and/or code instructions described herein provide a fully integrated, intelligent decision support system that enables the delivery of precision pollination services that optimize crop yield while enhancing honey bee health.

Reference is now made to FIG. 1, which is a table 202 summarizing some existing hive monitoring systems available for different companies, to help understand some embodiments of the present invention. As summarized in table 202, none of the existing hive monitoring systems generated indications of pollination, in particular pollination effectiveness. In contrast, at least some embodiments described herein compute one or more indications of pollination effectiveness by one or more ML models.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
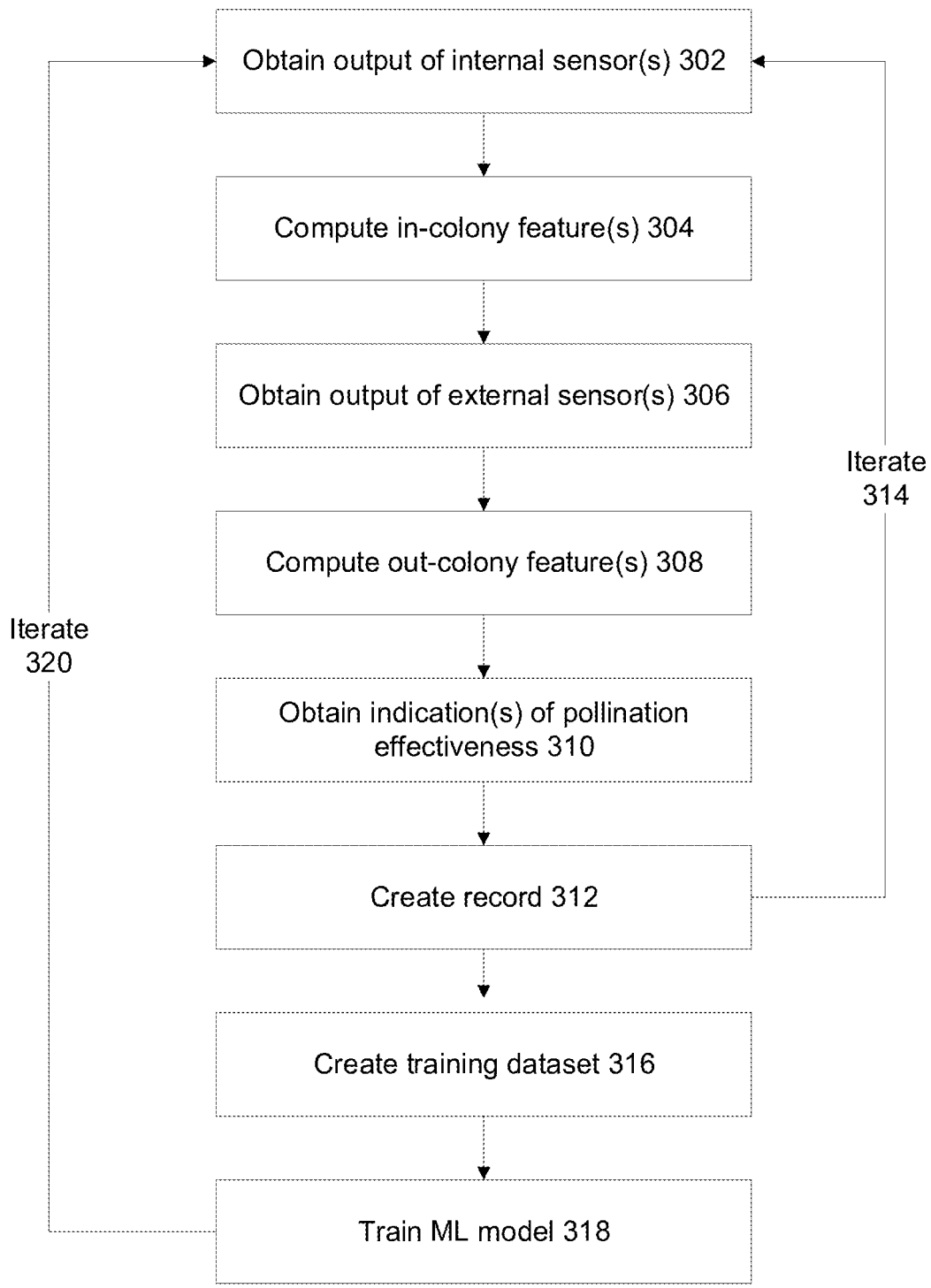
FIG. 3 is a flowchart of a method of training one or more ML models for generating an outcome indicative of pollination effectiveness of a honeybee colony, in accordance with some embodiments of the present invention.
Figure 4:
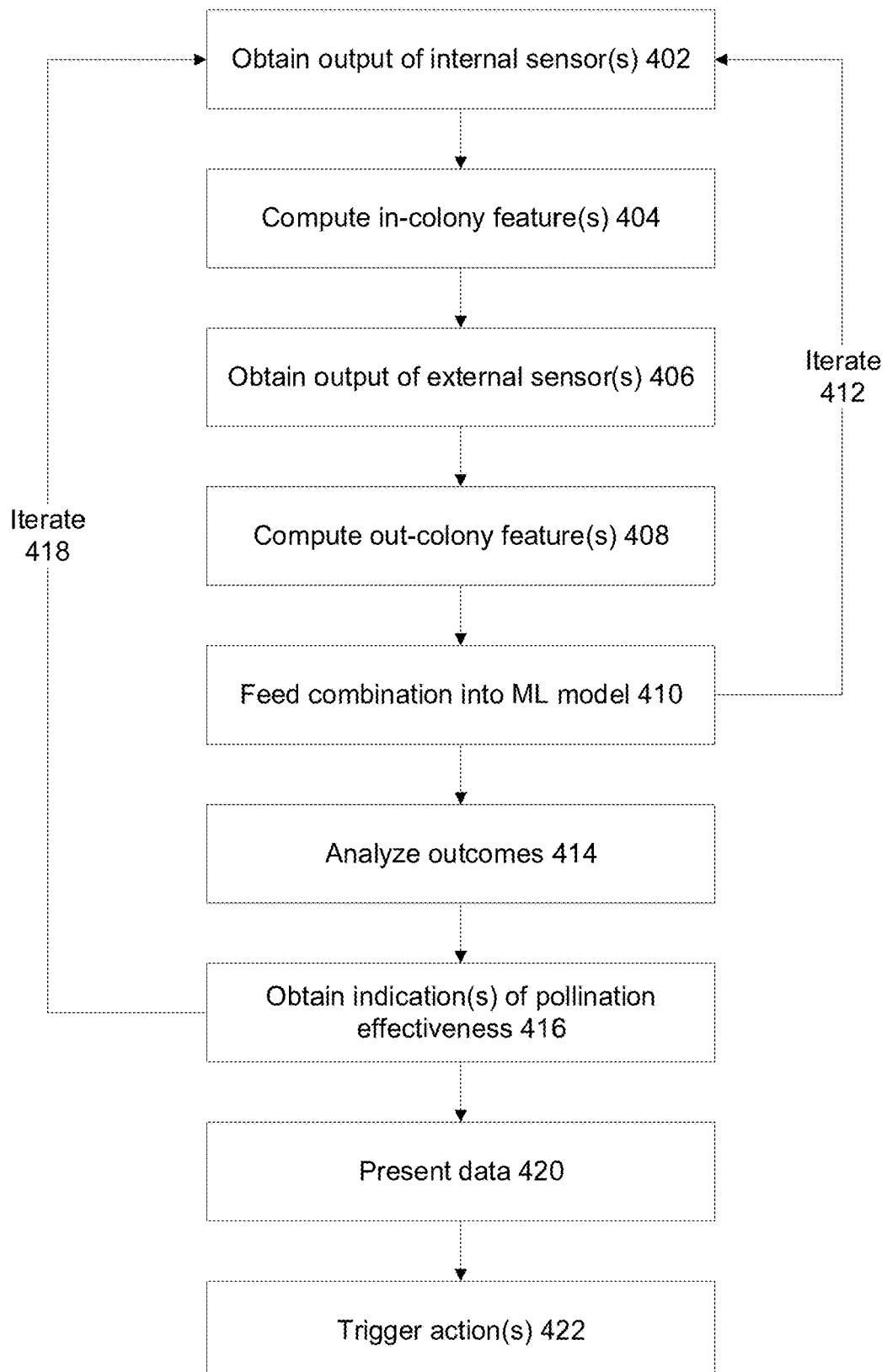
FIG. 4 is a flowchart of a method of inference by trained ML model(s) for generating an outcome indicative of pollination effectiveness of a honeybee colony, in accordance with some embodiments of the present invention.
Figure 5:
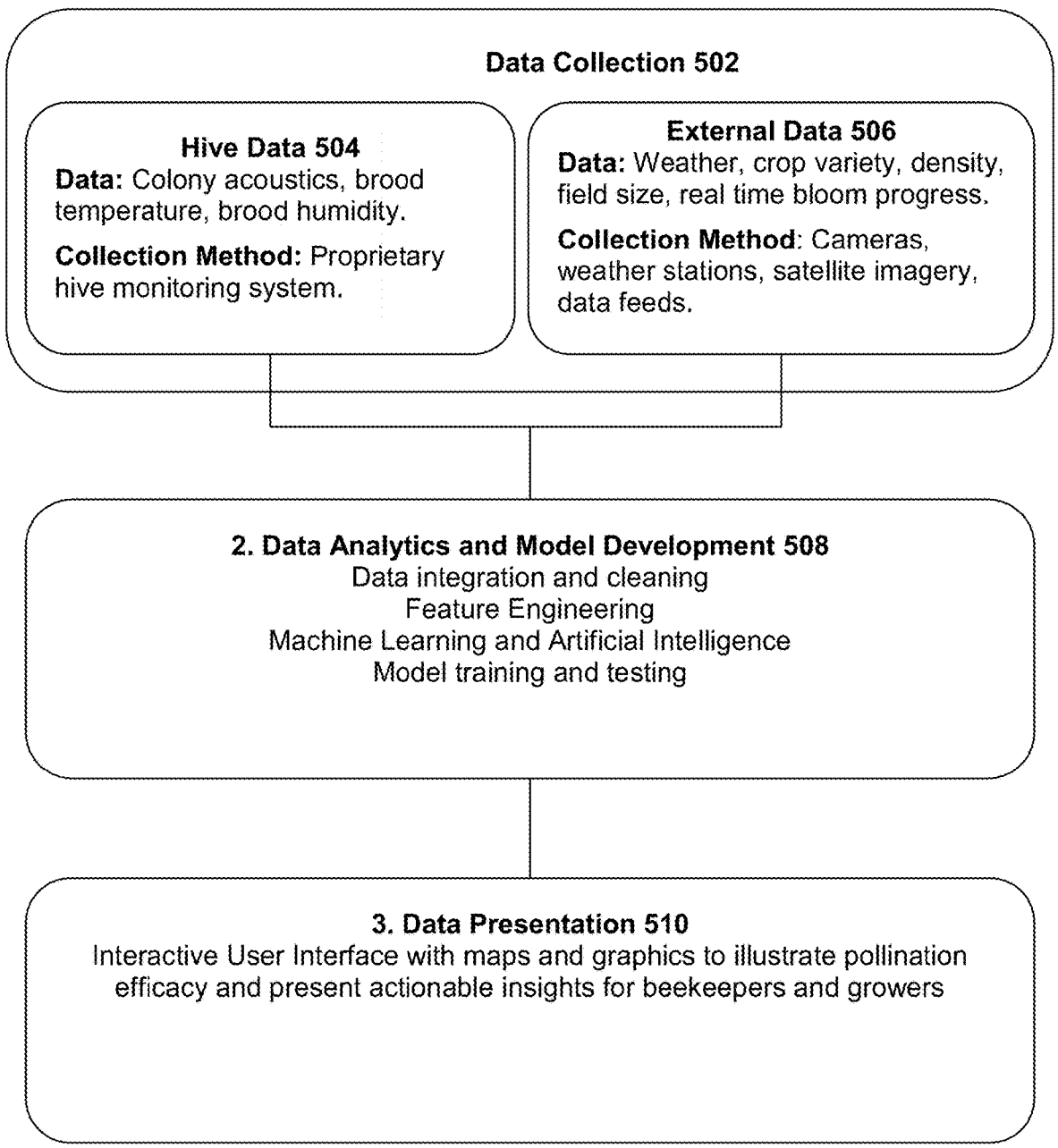
FIG. 5 is a flowchart of another exemplary method of training an ML model ensemble and/or inference by the ML model ensemble, in accordance with some embodiments of the present invention.
Figure 6:
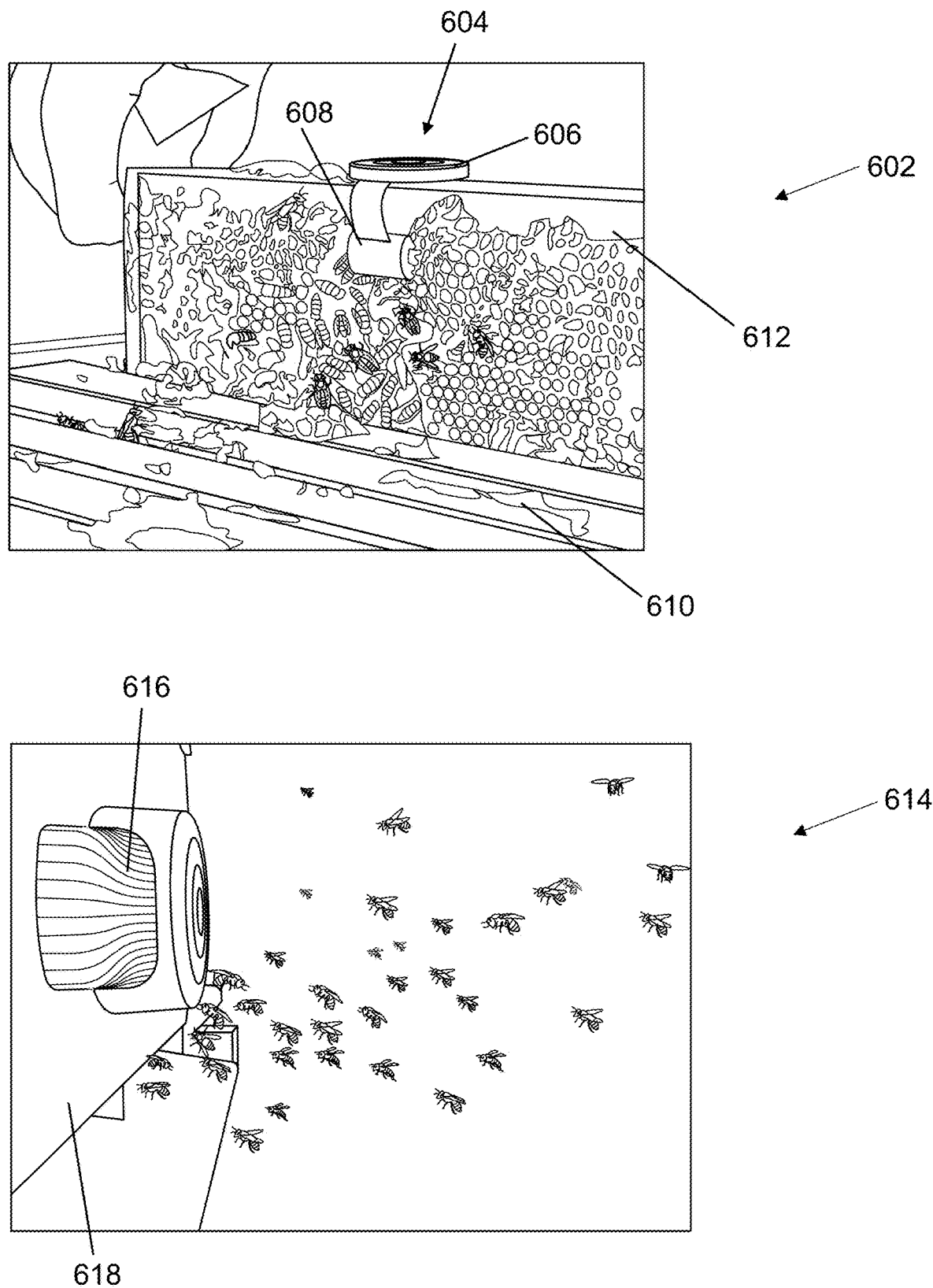
FIG. 6 are schematics depicting an exemplary hive monitoring system for remote monitoring of beehives, in accordance with some embodiments of the present invention.
Figure 7:
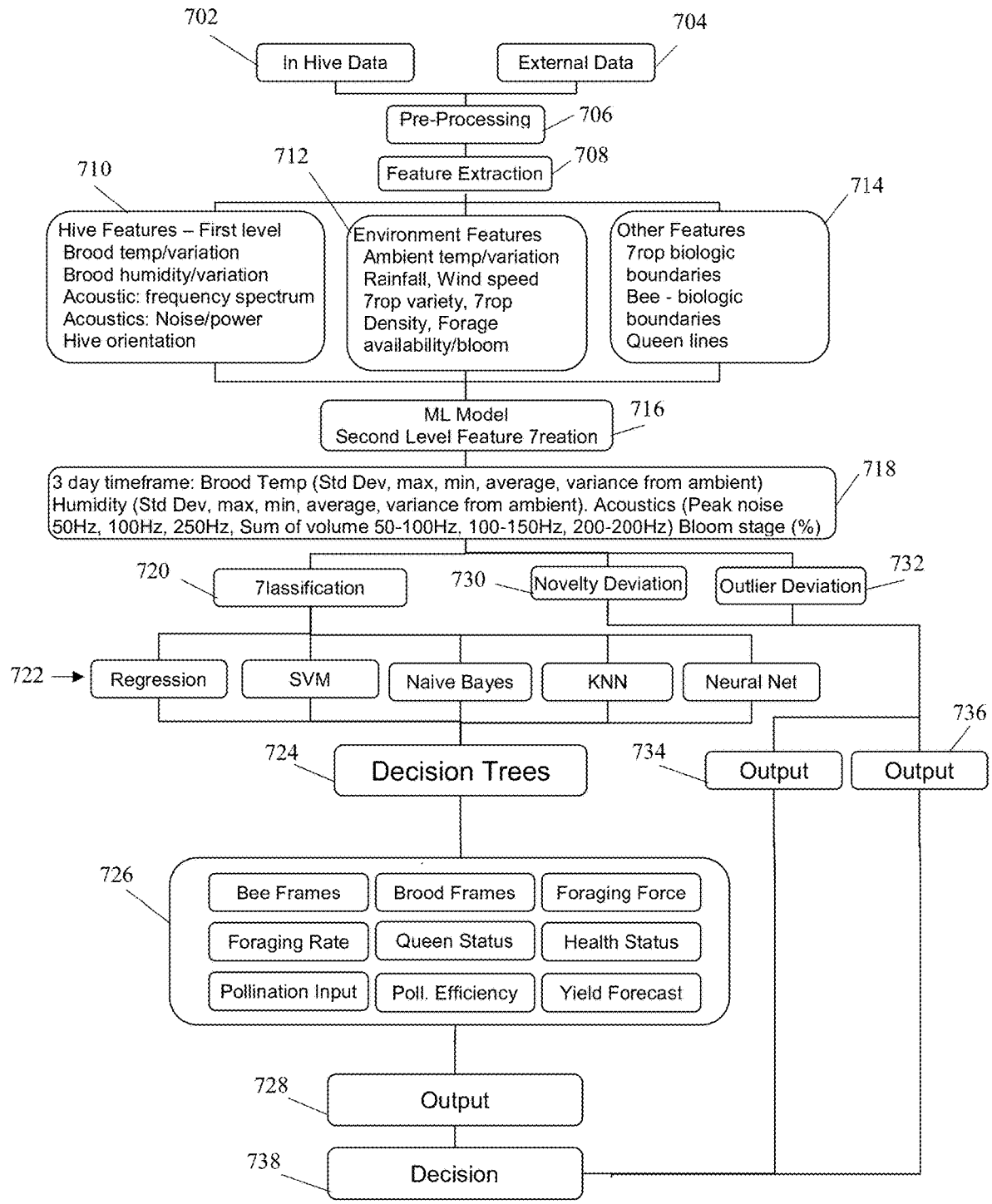
FIG. 7 is a flowchart of a method for obtaining an outcome indicating pollination effectiveness of a target honeybee colony based on in-colony feature(s) and/or out-colony feature(s), in accordance with some embodiments of the present invention.
Figure 8:
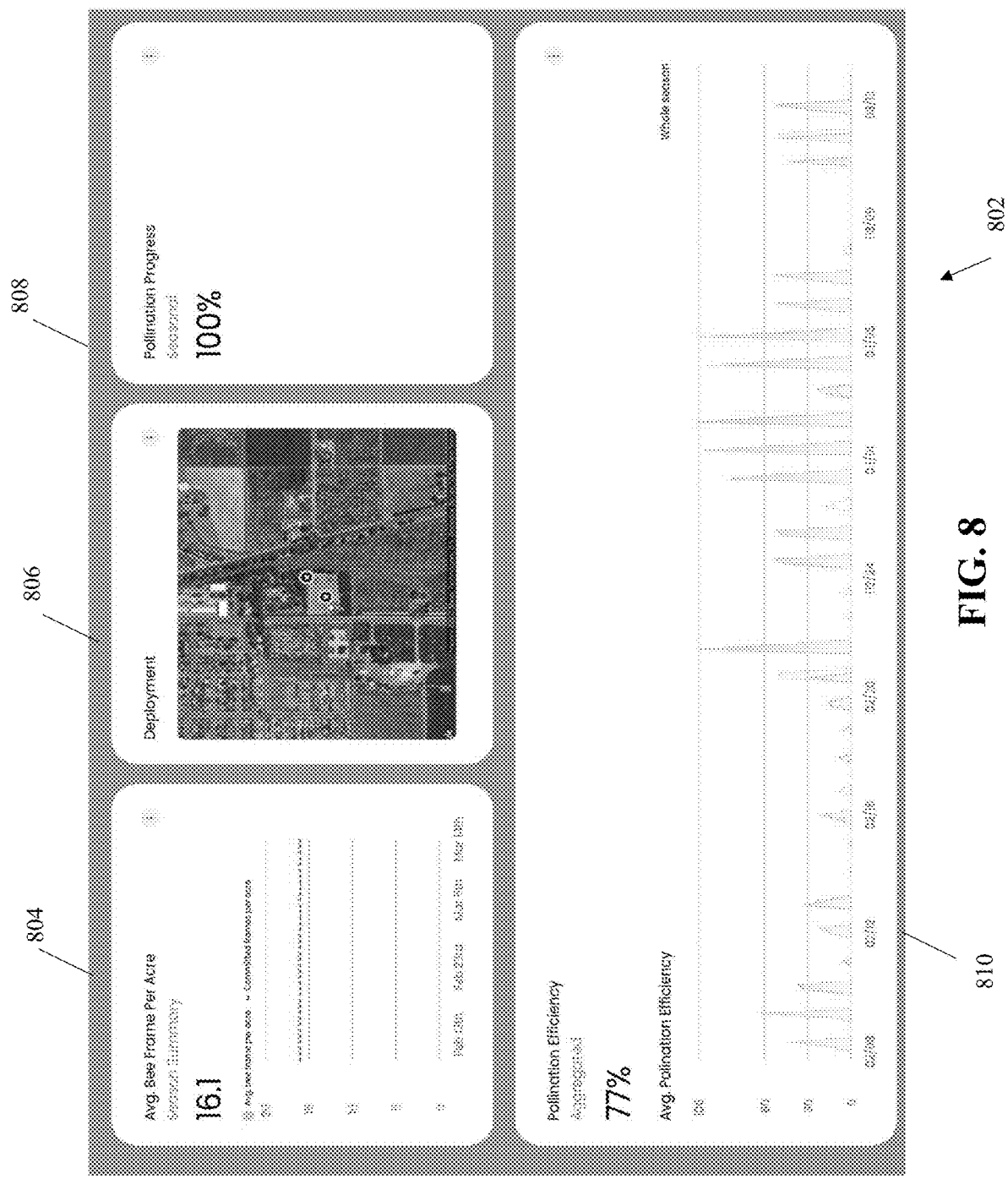
FIG. 8 is a schematic of user interface designed for presenting data to growers, in accordance with some embodiments of the present invention.
Figure 9:
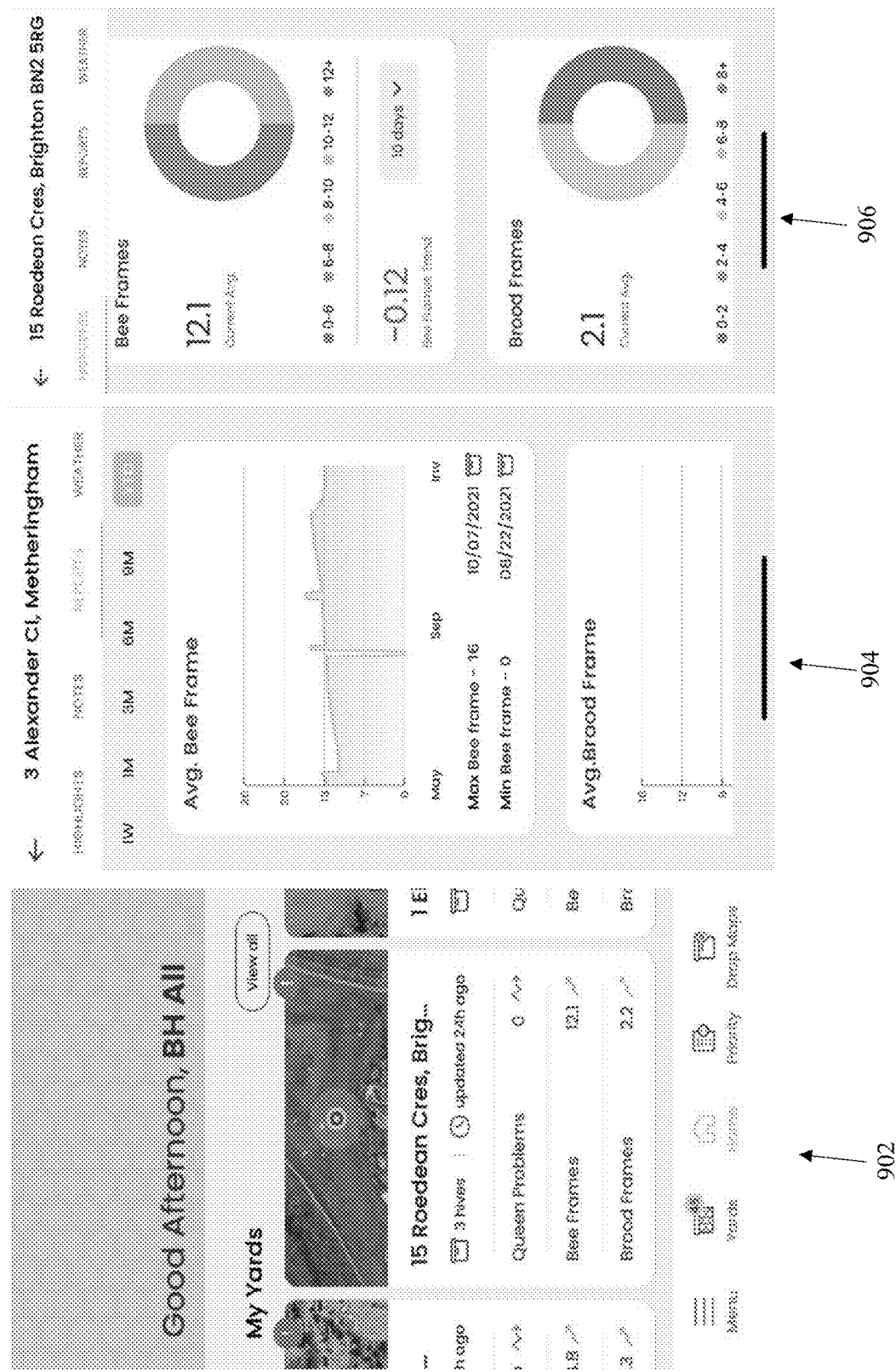
FIG. 9 is a schematic of user interfaces designed for presenting data to beekeepers, in accordance with some embodiments of the present invention.

Reference is now made to FIG. 2, which is a block diagram of a system 100 for training one or more ML models and/or for inference by the trained ML model(s) for generating an outcome indicative of pollination effectiveness of a honeybee colony, in accordance with some embodiments of the present invention. Reference is also made to FIG. 3, which is a flowchart of a method of training one or more ML models for generating an outcome indicative of pollination effectiveness of a honeybee colony, in accordance with some embodiments of the present invention. Reference is also made to FIG. 4, which is a flowchart of a method of inference by trained ML model(s) for generating an outcome indicative of pollination effectiveness of a honeybee colony, in accordance with some embodiments of the present invention. Reference is also made to FIG. 5, which is a flowchart of another exemplary method of training an ML model ensemble and/or inference by the ML model ensemble, in accordance with some embodiments of the present invention. Reference is also made to FIG. 6, which are schematics depicting an exemplary hive monitoring system for remote monitoring of beehives, in accordance with some embodiments of the present invention. Reference is also made to FIG. 7, which is a flowchart of a method for obtaining an outcome indicating pollination effectiveness of a target honeybee colony based on in-colony feature(s) and/or out-colony feature(s), in accordance with some embodiments of the present invention. Reference is also made to FIG. 8, which is a schematic of a user interface 802 designed for presenting data to growers, in accordance with some embodiments of the present invention. Reference is also made to FIG. 9, which is a schematic of user interfaces 902, 904, and 906 designed for presenting data to beekeepers, in accordance with some embodiments of the present invention. System 100 may implement the features of the method and/or components described with reference to FIGS. 3-9, by one or more hardware processors 102 of a computing device 104 executing code instructions 106A stored in a memory (also referred to as a program store) 106.

Computing device 104 receives data from sensors 112 associated with one or more hives 114.

Sensors 112 may include internal sensor(s) 112A and/or external sensors 112B.

Examples of internal sensor(s) 112A includes: temperature sensor, acoustic sensor (e.g., microphone), location sensor, and humidity sensor.

Examples of external sensor(s) 112B include: camera, weather station, satellite image sensor, and data feeds.

Computing device 104 may receive data from sensors 112 via one or more gateways 150 that may communicate with an external server.

Multiple architectures of system 100 based on computing device 104 may be implemented.

In an exemplary centralized architecture, computing device 104 may be implemented as one or more servers (e.g., network server, web server, a computing cloud, a virtual server) that provides services to multiple hives 114 which may be located in multiple geographic regions, for example, to different beekeepers and/or different crop growers that manage hives 114 in their respective field. In such architecture, computing device 104 may receive data from sensor(s) 112, for example, directly from respective sensor(s) 112 via network 110, from respective gateways 150 via network 110 where each gateway 150 obtains data from proximally located sensors 112, from respective client terminal(s) 108 via network 110 where each client terminal 108 receives data directly from associated sensor(s) 112 and/or from associated gateway(s) 150. Computing device 104 may feed respective sensor data of respective entities into ML model ensemble 120C (e.g., as described herein) and provide the outcome to the respective entities, for example, for presentation within a UI displayed on a display of respective client terminals 108.

In another exemplary localized architecture, computing device 104 may be implemented for providing local services. Computing device 104 may be implemented as a component within hive 114, for example, as a card and/or circuitry installed within the housing of gateway 150 installed within hive 114. In another implementation, computing device 104 may be an external device that is in local communication with sensors 112 and/or gateway 150 of hive 114, for example, computing device 104 is a mobile device (e.g., smartphone, laptop, watch computed) connected to sensors 112 and/or gateway of hive 114, for example, by a cable (e.g., USB) and/or short-range wireless connection. In such implementation, each computing device 104 may be associated with a single or small number of sensors 112 and/or gateway 150, for example, a user uses their own smartphone to connect to their own sensors 112 and/or gateway 150 for managing their own hives. In the localized implementation, ML model ensemble(s) 120C may be personalized for the target hive(s) 114 of the user, for example, ML model ensemble(s) 120C for different crops are generated. The specific ML model ensemble 120C provides to each respective user is according to the type of the target crop.

Computing device 104 may be implemented as, for example, a client terminal, a server, a virtual machine, a virtual server, a computing cloud, a mobile device, a desktop computer, a thin client, a Smartphone, a Tablet computer, a laptop computer, a wearable computer, glasses computer, and a watch computer.

Processor(s) 102 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include one or more processors (homogenous or heterogeneous), which may be arranged for parallel processing, as clusters and/or as one or more multi core processing units.

Memory 106 stores code instructions executable by hardware processor(s) 102. Exemplary memories 106 include a random-access memory (RAM), read-only memory (ROM), a storage device, non-volatile memory, magnetic media, semiconductor memory devices, hard drive, removable storage, and optical media (e.g., DVD, CD-ROM). For example, memory 106 may store code 106A that execute one or more acts of the method described with reference to FIGS. 3-5 and/or 7-9.

Computing device 104 (and/or server(s) 118) may include a data storage device 122 for storing data, for example, machine learning model(s) 120A, training dataset(s) 120B for training ML model(s) 120A, and/or ML model ensemble(s) 120C which include ML model(s) 120A and/or other code (e.g., set of rules), as described herein. Data storage device 122 may be implemented as, for example, a memory, a local hard-drive, a removable storage device, an optical disk, a storage device, and/or as a remote server and/or computing cloud (e.g., accessed over network 110). It is noted that code 120A-C may be stored in data storage device 122, with executing portions loaded into memory 106 for execution by processor(s) 102.

ML model ensemble(s) 120C includes ML model(s) 120A and/or other code (e.g., set of rules), as described herein. ML model(s) 120A are trained on training dataset(s) 120B, as described herein. Training of ML model(s) 120A may be done by computing device 104 and/or by another device (e.g., server 118) that provides trained ML model(s) 120A and/or ensemble 120C to computing device 104.

Machine learning model(s) 120A may be implemented, for example, as one or combination of: a classifier, a statistical classifier, one or more neural networks of various architectures (e.g., convolutional, fully connected, deep, encoder-decoder, recurrent, graph, combination of multiple architectures), support vector machines (SVM), logistic regression, k-nearest neighbor, decision trees, boosting, random forest, a regressor and the like. ML model(s) 120A may be trained using supervised approaches and/or unsupervised approaches on training dataset(s) 120B.

Computing device 104 may include a network interface 122, for connecting to network 110, for example, one or more of, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Network 110 may be implemented as, for example, the internet, a local area network, a virtual network, a wireless network, a cellular network, a local bus, a point-to-point link (e.g., wired), and/or combinations of the aforementioned.

Computing device 104 may communicate with one or more of the following over networks 110:

Sensor(s) 112 to obtain measurements.

Gateway(s) 150 to obtain measurements of sensor(s) 112 in communication with the respective gateway 150.

Client terminal(s) 108 to provide the outcome(s) of ML model ensemble(s) 120C fed the measurements made by sensor(s) 112. Client terminal(s) 108 may provide measurements made by sensor(s) 112 in communication with the respective client terminal 108, optionally via respective gateway 150 which is in communication with sensor(s) 112 and client terminal 108.

Server(s) 118, for example, to obtain other sensor data (e.g., from a weather server, from a satellite imaging server), to obtain updated versions of ML model(s) 120A and/or updated versions of ML model ensemble(s) 120C, and the like.

Computing device 104 may include and/or be in communication with one or more physical user interfaces 124 that include provide a mechanism to enter data (e.g., geographic location, number of hives) and/or view data (e.g., real time estimated number of bees, real time queens status) for example, one or more of, a touchscreen, a display, gesture activation devices, a keyboard, a mouse, and voice activated software using speakers and microphone.

It is noted that client terminal(s) 108 may be used as user interface 124 and/or may include user interface 124 for entering data into computing device 104 and/or viewing data generated by computing device 104.

Referring now back to FIG. 3, at 302, output (e.g., measurements, data) of one or more internal sensors is obtained (e.g., accessed, provided, received). The internal sensor(s) monitor a honeybee colony, optionally monitoring conditions within the physical structure of the beehive where the bees and/or bee brood reside, for example, the apiary.

The honeybee colony being monitored by the internal sensor(s) may be positioned for pollination of one or more crops in a geographical area. For example, for pollination of almonds in an orchard of almond trees, for pollination of sunflowers (e.g., for sunflower seeds/oil) of an agricultural file, and pollination of apples in an orchard.

The honeybee colony may refer, for example, to a single hive, a set of defined hives located in close proximity to each other, a set of bee frames which may be in a single hive or in multiple hives, an single apiary, and the like.

During generation of a record for a training dataset, the honeybee colony may be referred to as a sample honeybee colony.

Examples of internal sensors and corresponding outputs include: temperature sensor for measuring temperature (e.g., brood temperature), a humidity sensor for measuring humidity (e.g., brood humidity), a stereo microphone for measuring colony acoustics, a location sensor for sensing a location thereof, and a weather station (e.g., disposed within an apiary that includes the hive of the sample honeybee colony) that monitors microclimate within and/or in proximity to the apiary. Inventors discovered that the microclimate at the hives has a significant impact on the bee foraging behavior. Examples of weather station internal sensors include: a temperature sensor for sensing temperature, a wind speed sensor for sensing wind speed, a wind direction sensor for sensing wind direction, and a rainfall sensor for sending rainfall.

The internal sensor(s) may generate output, for example, continuously, at predefined intervals (e.g., every minute, or hour, or day, or other interval), at selected events (e.g., triggered when a set of rules is met, such as data of another sensor having a certain value), and/or in response to a query.

An exemplary internal sensor may include one or more of the following components: circuitry for wireless communication, an on-board power supply (e.g., battery, solar power, wind power), a connector for connecting to a bee frame (e.g., clip, glue, screw), and a sensing circuitry that senses the environment and generates the output (e.g., measurements).

Optionally, multiple internal sensors are in wireless communication with a gateway. The gateway may be in communication with a server. The internal sensors may be grouped per gateway, for example, a single gateway per bee hive in communication with multiple internal sensors connected to multiple bee frames (e.g., one or more internal sensors per bee frame). The gateway and internal sensor architecture enables, for example, optimizing communication, control, and/or power, for example, the multiple internal sensors operate on low power sufficient to communicate with the gateway located close by, whereas the gateway operates with stronger power to communicate with the server which may be located further away (e.g., over a wireless network, cellular network, and the like). Management of internal sensors may be simplified using the gateway, for example, for upgrading firmware, the firmware is sent to the gateway, which updates the internal sensors in communication with the gateway.

Additional exemplary details of the internal sensor and gateway are described with reference to FIG. 6. Internal sensors and/or the gateway may communicate with each other and/or with another device based on an internet of things (JOT) sensor technology protocol and/or platform.

At 304, one or more in-colony feature(s) are computed based on the output of one or more internal sensor(s). Each in-colony feature is indicative of an internal state of the honeybee colony.

A respective in-colony feature may be computed from a respective output of an internal sensor. Alternatively or additionally, multiple outputs of multiple different internal sensors may be combined to obtain an in-colony feature.

It is noted that in-colony features may be dependent on one another, for example, a first computed in-colony feature is used to compute a second in-colony feature.

Examples of in-colony features include:

Demography, for example, age distribution of worker bees, percent of bees at different life cycle stages, such as egg, larvae, sealed brood, and adult.

Presence of queen, i.e., whether there is a laying queen bee present in the hive. The presence of the queen may be detected, for example, by detecting stability (e.g., within a tolerance) of brood temperature between (about) 32-36 degrees Celsius (or other range, such as 31-37) for 6 (or other number such as 3, 5, 7 or other) consecutive days. In another example, by detecting changes in amplitude of the temperature less than (about) 4 degrees Celsius (or other value, such as 3, 5, or other) in about 24 hours (or other time interval, such as 12 hours, or 36 hours, or 48 hours, or other). A queenless state, i.e., no queen in the hive (e.g., during brood rearing season) may be identified, for example, by detecting a correlation between the internal brood temperature and the external ambient temperature (e.g., within a tolerance range) for at least a time interval (e.g., 1, 3, 5 days, or other values).

Brood/colony status, for example, health status, number of brood frames, state of brood (e.g., percentage at egg, larvae, and pupae), availability of food, presence of infection, and the like.

Brood/colony status may refer to a stage in brood rearing and/or colony cycle. For example, active brood rearing. Active brood rearing may be detected by measured brood temperature, for example, detecting stability (e.g., within a tolerance) of brood temperature between (about) 32-36 degrees Celsius (or other range, such as 31-37) for 4 (or other number such as 3, 5, or other) consecutive days. In another example, the brood status may be that the colony is broodless, i.e., no brood rearing is occurring. Broodless status may be detected when the average brood temperature is below about 25 degrees Celsius (or other value, such as 23, or 27, or other) with daily variation, for example, greater than 5 degrees Celsius (or other value such as 3, or 7, or other) for 4 (or other number such as 3, 5, or other) consecutive days. In another example, the brood/colony status indicates a dead colony, i.e., no brood and/or no bees. The dead colony status may be detected, for example, when the internal brood temperature is correlated with the external ambient temperature (e.g., within a tolerance range) for 3 (or other number such as 2, 4, or other) consecutive days.

Brood variation, for example distribution of the different parameters of the brood status.

Hive orientation, for example, which direction the beehive is facing, and/or location of the hive.

Colony strength and/or size may be measured as, for example, number of bees (e.g., estimate) in the colony, and/or number of been frames in the colony. The colony strength and/or size may be measured, for example, using the colony acoustics and/or brood temperature described below.

Colony acoustics (e.g., obtained from one or more acoustic sensors such as microphones): acoustic signatures that indicate one or more parameters of the honey bee colony, for example, colony strength, colony status, and colony foraging activity. Colony acoustics, may include, for example, acoustic frequency spectrum, and/or acoustic noise/power. The acoustic signature may be an in-colony feature. The colony strength, colony status, and colony foraging activity may be in-colony features.

Colony strength may be computed from internal colony acoustics, for example, computed from a value indicating peak volume in the frequency ranges that occur between midnight and 6:00 am (or other ranges such as 10 pm to 7 am that may vary such as per season): for example, (about) 50-100 Hertz (Hz), (about) 100-150 Hz, (about) 200-300 Hz, and others ranges that are lower, intermediate, or higher. In another example, computed from sum of volume in the frequency ranges that occur between midnight and 6:00 am (or other ranges such as 10 pm to 7 am that may vary such as per season): (about) 50-100 Hz, (about) 100-150 Hz, (about) 200-300 Hz, and others ranges that are lower, intermediate, or higher.

Colony foraging activity, for example, the amount of foraging and/or flying activity of the bees. Colony foraging activity may be computed from internal and/or external colony acoustics (e.g., signatures). Colony foraging activity may be computed using external acoustics (e.g., measured by an acoustic sensor such as a microphone outside the entrance of the hive), as peak volume and/or sum of volume in the frequency range of (about) (about) 200-250 Hz and/or other range, during daytime (e.g., 9 am to 6 pm, or other ranges that may vary such as per season).

Colony foraging activity may be computed from internal colony acoustics, for example, computed from a value of internal colony acoustics that occur between midnight and 6:00 am (or other ranges such as 10 pm to 7 am): for example, difference (Hz) between peak volume in (about) 50-100 Hz range and peak volume in (about) 100-150 Hz range, and/or amplitude (dB) between peak volume in (about) 50-100 Hz range and peak volume in (about) 100-150 Hz range.

The colony strength, colony status, and colony foraging activity may be computed, for example, as the value of the acoustics, by a function applied to a value of the acoustics, and/or by a mapping process applied to the value of the acoustics such as a trained machine learning model that is fed the value.

Brood temperature, which may be used to compute colony strength. Brood temperature may include one or more of the following: Average brood temperature over 3 (or other number, such as 5, 7) days and rate/or of change of brood temperature (derivative), standard deviation of brood temperature and/or rate of change of standard deviation, and relationship between outside (e.g., ambient) temperature and/or internal brood temperature—the degree to which internal brood temperature follows external (ambient) temperature.

The colony strength may be computed, for example, by a function applied to the brood temperature, and/or by a mapping process applied to the brood temperature such as a trained machine learning model that is fed the brood temperature.

At 306, output (e.g., measurements, data) of one or more external sensors is obtained (e.g., accessed, provided, received). The external sensor(s) monitor the environment of the honeybee colony, for example, the external environment in proximity to the physical structure of the beehive where the bees and/or bee brood reside, for example, the apiary.

Examples of external sensors and corresponding outputs include: camera, weather station, satellite image sensor, and data feeds.

The external sensor(s) may generate output, for example, continuously, at predefined intervals (e.g., every minute, or hour, or day, or other interval), at selected events (e.g., triggered when a set of rules is met, such as data of another sensor having a certain value), and/or in response to a query.

At 308, one or more out-colony feature(s) are computed based on the output of one or more external sensor(s). Each out-colony feature is indicative of an external environment of the honeybee colony.

A respective out-colony feature may be computed from a respective output of an external sensor. Alternatively or additionally, multiple outputs of multiple different external sensors may be combined to obtain an out-colony feature.

Examples of out-colony features that may be obtained, for example, from the weather station and/or satellite imaging sensor and/or data feeds include: weather conditions, ambient temperature, ambient variation, crop density, crop variety, crop yield, forage availability, forage bloom, cover crops, field size, real time blood progress, forage availability, crop variety, ambient temperature, wind speed, wind direction, rainfall, air pressure, ultraviolet (UV) light, and cloud cover.

In one example of an out-colony feature, images captured by the camera may be analyzed, for example, using time lapsed photography of the target crop over a time interval (e.g., the bloom period) to assess the proportion (e.g., percentage) of buds/crop in a ready state (e.g., open) for pollination in real time.

At 310, a pollination effectiveness of the honeybee colony is measured and/or computed. The pollination effectiveness may be a parameter indicating impact of the ability of the honeybee colony to pollinate the target crop.

One or more of the following exemplary parameters may be included in the pollination effectiveness:

A number of honeybees for delivery to the target crop for pollination thereof, for example, as described herein with reference to the in-colony features.

A pollination efficiency of the honeybee colony, for example, proportion of the target crop(s) successfully pollinated.

An indication of health of the hive(s) (e.g., apiary) that house the honeybee colony, for example, as described herein with reference to the in-colony features.

A status of a queen of the sample honeybee colony, for example, as described herein with reference to the in-colony features.

An amount of brood, for example, as described herein with reference to the in-colony features.

Honeybee foraging activity. Bees may adapt foraging behavior to suit forage availability around the hive. Honeybee foraging activity may be determined according to forage available for crop pollination around a hive (e.g., apiary) of the honeybee colony. The forage available for crop pollination may refer to a proportion of the crop at a certain stage of crop bloom and/or a percentage of the crop at crop bloom. Crop bloom may refer to crop which is flowering and/or producing nectar and/or producing pollen. The proportion of the crop at the certain stage of crop bloom and/or the percentage of the crop at crop bloom may be computed by an image processing process that is fed images of the crop captured by at least one camera, for example, a trained machine learning model (e.g., neural network) and/or image processing process that detects features in the image indicative of crop bloom. The images for analysis and/or for training may be captured, for example, by a generic cellular train camera that is positioned strategically in the field for collecting time series images of the crop following.

At 312, a record is created for the sample honeybee colony. The record includes one or more of the in-colony features, one or more of the out-colony features, and a ground truth label indicating one or more of the pollination effectiveness parameters. The in-colony features and the out-colony features may be defined as a combination thereof, where the combination of the in-colony features and the out-colony features is included in the record.

Optionally, one or more additional in-colony and/or out-colony features are included in the record. The additional features are obtained by approach other than sensors, for example, manually entered by a user (e.g., via a user interface, which may be a graphical user interface). Examples of additional features which may be provided by the user that included in the record include: agricultural data (e.g., crop variety, crop density, crop yield, and crop cover), and queen line. Indication of fields and/or orchards may be marked on a map, with data for records entered for each, for example, orchards of a certain type (e.g., almond trees) may be marked and records created. Queen line refers to the queen breeding process of selection the lines with desirable traits that are to be propagated by queen rearing. The queen breeding process may be enhanced by assessing the efficiency of different queen lines.

It is noted that one or more of the in-colony features may be used as the ground truth of pollination effectiveness parameters, i.e., the record includes the value as the pollination effectiveness parameter rather than the in-colony feature, for example, status of the queen is the pollination effectiveness parameter (rather than an in-colony feature) as a ground truth, with brood temperature as the in-colony feature that is used to compute the status of the queen, as described herein.

It is noted that the data included in the record is collected and structured using approaches described herein, since no foundational dataset of such raw data exists. It is technically challenging to analyze and/or integrate data from large heterogeneous datasets collected by different approaches, from different sources, and/or delivered in different format (e.g., way sound files, images, data from databases, spreadsheets, and the like). The raw data described herein may be obtained from sensors as described herein, and/or some data such as weather data and/or geographical data may be fragmented across multiple different sources. The record described herein defines a standardized and/or structured format for the data, for training the ML models, and/or defines the standardized and/or structures format for data that is inputted into the trained ML models.

At least some in-colony and/or out-colony features described herein are designed using a feature engineering process in order to identify the optimized set of features that will be used to train the ML model(s) for perform the prediction(s). Engineered and/or selected features are designed to increase the efficiency of the training process, which attempts to extract the key information contained in the data. The features may improve the power of the trained ML models to classify the input data accurately and/or to predict outcomes of interest more robustly.

At 314, one or more features described with reference to 302-312 may be iterated. Iterations may be performed for creating multiple records for different sample bee colonies (e.g., hives, apiary) of the same target crop, and/or for multiple different bee colonies (e.g., hives, apiary) of the different target crop (e.g., at different geographical locations). The target crop may be of the same type (e.g., almonds, apples, and the like) or may be for different types.

Optionally, during the iterations, the output of the external sensor(s) and/or the output of the internal sensor(s) may be monitored over a time interval to obtain multiple values, for example, collecting values per minute over a day, or per hour over a day, or per day over a month, and the like. The in-colony feature(s) and/or the out-colony feature(s) may be computed as statistical features of the values, for example average value over the day, maximum and minimum values over a week, standard deviation over the month, and the like.

At 316, a multi-record training dataset is created by including the multiple records.

At 318, a machine learning model is trained on the multi-record training dataset. Examples of ML models architecture implementations include: a classifier, a statistical classifier, one or more neural networks of various architectures (e.g., convolutional, fully connected, deep, encoder-decoder, recurrent, graph, combination of multiple architectures), support vector machines (SVM), logistic regression, k-nearest neighbor, decision trees, boosting, random forest, XGBoost, Distributed Random Forest (DRF), Gradient Boosting Machine (GBM), and Extremely Randomized Trees (XRT).

At 320, one or more features described with reference to 302-318 may be iterated for creating multiple training datasets for training multiple ML models. Each multi-record training dataset includes a different set of records, for example, different ground truth values, different combinations of features, and/or records for different types of target crops.

The multiple ML models may be arranged as an ensemble. During inference, different combines are fed into the different ML models of the ensemble, to obtain respective outcomes. Weights may be assigned to the outcomes. An aggregation model (e.g., set of rules, another train ML model) may receive the weighted outcomes as input, and generate a final prediction as outcome.

In an exemplary implementation, the ensemble of machine learning models generate one or more of the following outcomes (e.g., which may be ground truths of records of different training datasets used to train the ML models of the ensemble):

Bee frames indicating hive strength as expressed by a number of bee frames and/or an indication of growing and/or declining number.

A number of brood frames and/or an indication of growing and/or declining number.

Queen status indicating presence of a laying queen in the colony.

Health status indicating presence of disease and/or infection and/or infestation.

Pollination input indicating optimum number of bees and/or bee frames for pollinating the target crop(s).

Foraging force indicating total number of foraging trips delivered by the honeybee colony to the target crop(s).

Foraging rate indicating number of bees leaving the hive per time interval.

Pollination efficiency indicating proportion of the target crop(s) successfully pollinated.

Yield prediction indicating estimated nut/fruit set and/or yield.

Referring now back to FIG. 4, at 402, output of one or more internal sensor monitoring the target honeybee colony is obtained. Details of exemplary outputs and/or exemplary internal sensor(s) are described herein, for example, with reference to 302 of FIG. 3.

The target honeybee colony refers to the honeybee colony for which an evaluation by the ML model(s) (e.g., ensemble) is done during the inference stage.

At 404, one or more in-colony features indicative of an internal state of the target honeybee colony are computed from the output of the internal sensor(s). Alternatively or additionally, one or more in-colony features are obtained from non-sensor sources, for example, manually entered by a user, and/or automatically accessed from a dataset. Details of exemplary in-colony features are described herein, for example, with reference to 304 of FIG. 3.

At 406, output of one or more external sensor monitoring the environment of the target honeybee colony is obtained. Details of exemplary outputs and/or exemplary external sensor(s) are described herein, for example, with reference to 306 of FIG. 3.

At 408, one or more out-colony feature indicative of an external environment of the honeybee colony are computed from the output of the external sensor(s).

Alternatively or additionally, one or more out-colony features are obtained from non-sensor sources, for example, manually entered by a user, and/or automatically accessed from a dataset. Details of exemplary out-colony features are described herein, for example, with reference to 308 of FIG. 3.

At 410, a combination of the in-colony feature(s) and the out-colony feature(s) are fed into a machine learning model. The ML model is trained as described herein, for example, with reference to FIG. 3.

At 412, one or more features described with reference to 402-410 may be iterated for generating multiple combinations of the in-colony feature(s) and the out-colony feature(s), and feeding the combinations into multiple different ML models which may be of an ensemble.

At 414, multiple outcomes are obtained from the multiple different ML models. Weights may be assigned to the outcomes. The weighted outcomes may be analyzed, optionally by feeding the weighted outcomes into an aggregation model. that generates a final prediction as an outcome.

At 416, a final prediction is obtained based on the analysis of the outcomes of the ML models, optionally based on the analysis of the weighted outcomes. The final prediction may be obtained as an outcome of the aggregation model fed the (optionally weighted) outcomes of the ML models.

The final prediction indicates one or more pollination effectiveness parameters for the target honeybee colony.

At 418, one or more features described with reference to 402-410 may be iterated for each one of multiple honeybee colonies positioned for pollination of the target in a geographical area. For example, for pollination of an orchard of almonds, 15 honeybee colonies may be positioned, in which case an iteration may be performed for each honeybee colony.

It is noted that an iteration may be performed per sub-unit defining the honeybee colony, for example, per hive where the honeybee colony includes multiple hives, per apiary where the honeybee colony includes multiple aviaries, and per single or set of bee frames where the honeybee colony includes multiple bee frames in one or more hives, and the like.

Optionally, the iterations are performed in near real time over multiple time intervals, for generating near real time monitoring of the honeybee colonies. For example, iterations are performed per minute, per hour, per day, per week, and the like, over multiple minutes, hours, days, weeks, and months. This enables near real time adaptation to changes that may suddenly occur in the honeybee colonies, for example, depth of a queen bee, or spread of a disease. Such changes may take a significant amount of time to detect and respond to using standard approaches, making the response too late to improve pollination for the current season, and/or irrelevant by the time it takes place (e.g., many or all bees have died from the disease). The real tie monitoring enables detection and response early, which may improve pollination for the current season and/or may impact the honeybee colony if prompt action is taken (e.g., save honeybees from dying from the disease).

At 420, the obtained pollination effectiveness parameter(s) may be provided, for example, presented on a display of a computing device, stored on a data storage device, forwarded to another process (e.g., to trigger automated actions), and/or forwarded to another computing device (e.g., over a network).

It is noted that the in-colony features and/or out-colony features may be provided.

Examples of user interfaces, optionally graphical users interfaces, for presentation of data described herein are describe, for example, with reference to FIGS. 8 and 9.

The interactive user interface (e.g., GU) may presents the key metrics and/or actionable insights generated in a way that is accessible and/or understandable to help users, for example, beekeepers and/or farmers, make informed decisions that optimize honey bee health and/or pollination efficacy.

At 422, one or more actions may be triggered in response to the final prediction. The actions may be triggered manually and/or automatically. The action may include instructions for implementation, for example, code for execution by another process and/or controller, or recommendations for manual implementation, for example, as a message, video, animation, text, audio recording/synthesis, and the like.

The actions may be triggered based on an analysis of the obtained pollination effectiveness parameter(s) and/or combination of the in-colony feature(s) and/or the out-colony feature(s), for example, by a set of rules, a threshold, a range, and another trained ML model.

The combination of the in-colony feature(s) and/or the out-colony feature(s) and/or the obtained pollination effectiveness parameter(s) may be analyzed to identify whether an internal state has unexpectedly changed. Change of the internal state of one or more of the following may be detected: a hive relative to itself (i.e., recent change relative to historical values), a hive relative to other hives in the geographical location, and a hive relative to other hives in other geographical locations of a region. The change may be detected, for example, as a statistical deviation above a threshold relative to the reference, for example, average value greater than 2 standard deviations of the reference values.

In an example, the pollination effectiveness is a predicted number of honeybees for delivery to the target crop for pollination thereof. A current number of honeybees may be determined, for example, computed as an in-colony features. When the current number of honeybees is below the predicted number of honeybees, instructions for ordering an additional number of honeybees for obtaining the additional number of honeybees may be generate, for example, an order message is automatically generated and sent, and/or a message is presented in the GUI recommending to the user to order the additional number of honeybees.

Exemplary actions include: moving one or more beehives to different locations, adding one or more new beehives, removing one or more existing beehives, applying a medication for treatment of a disease infecting the beehive, and the like.

Referring now back to FIG. 5, features of the method described with reference to FIG. 5 may be implemented by components of the system 100 described with reference to FIG. 2. Features of the method described with reference to FIG. 5 may be implemented with, combined with, and/or substituted with, features of the method described with reference to FIGS. 3-4 and 7-9.

At 502, data collection is performed. Data collection includes collection of hive data A04 from the hive, and/or external data 506 from outside the hive.

At 504, hive data is collected. The hive data may be collected using internal sensors designed to measure within and/or in near proximity to the hive. Examples of internal sensors are described herein. Examples of data collected by the internal sensors include colony acoustics, brood temperature, and brood humidity.

At 506, external data is collected. The external data may be collected using external sensors designed to measure externally to the hive. Examples of external sensors include cameras, weather stations, satellites image sensors, and data feeds. Examples of data collected by the examples sensors include weather, crop variety, crop density, field size, and real time bloom progress.

At 508, the data sensed by the sensors is analyzed and/or processed, for example, data from different sensors is integrated, and/or the data is cleaned. The ML model ensemble may be trained and/or tested, for example, using features engineers from the data.

At 510, during inference, outcomes of the ML model ensemble in response to an input of the data sensed by the sensors, may be presented on a display. For example, within an interactive user interface with maps and/or graphics designed to illustrate pollination efficacy and/or present actionable insights for beekeepers and/or growers.

Referring now back to FIG. 6, the hive monitoring system may include internal sensors and/or external sensors, and/or gateway(s). The hive monitoring system is designed to monitor a large number of hives, for example, on the order of millions, for example, at least 10, or 100, or 1000, or 10000, or 100000, or 1000000, or 10000000 hives.

Schematic 602 depicts an in-hive sensor 604. In-hive sensor 604 may include multiple internal sensors, for example, a temperature sensor for sensing temperature, a humidity sensor for sensing humidity, and a colony acoustics sensor (e.g., stereo microphone) for sensing colony acoustics. In-hive sensor 604 may include a housing 606 that houses the internal sensors. In-hive sensor 604 may include a connector 608 designed to securely connect housing 606 to a hive 610, optionally reversibly (i.e., easily connected and detached) for example, a clip designed to clip to a bee frame 612 of the hive. In-hive sensor 604 may include a wireless transceiver and/or circuitry designed for wireless communication (e.g., Bluetooth Low Energy (BLE) 5.1), for example, with a gateway. In-hive sensor 604 may include an on-board power supply, for example, a battery, solar panels, and the like. Settings and/or firmware of in-hive sensor 604 may be remotely upgraded.

Schematic 614 depicts a gateway 616, which may be installed on a hive 618, for example, secured to the external surface of the housing of hive 618. Gateway 616 may include a wireless transceiver and/or circuitry designed for wireless communication (e.g., BLE 5.1). Gateway 616 may collect data from multiple in-hive sensors 604 (e.g., via BLE 5.1), for transmission to a remote computing device, for example, a computing cloud and/or server (e.g., via a GSM network, such as 4G and/or LTE). The computing cloud and/or server analyzes and/or interprets the data using the ML model ensemble, as described herein. Gateway 616 may include an on-board power supply, for example, a battery, solar panels, and the like. Settings and/or firmware of gateway 616 may be remotely upgraded. Optionally, one gateway 616 is used for each group of hives, for example, 4 hives (or other numbers) which may be the number of hives that commercial beekeepers manage on pallets. Gateway 616 may include internal and/or external sensors for measuring data, for example, an acoustic sensor for measuring sound, a temperature sensor for measuring temperature, and IHS position sensor for measuring IHS positon, and a location sensor for sensing location. Settings and/or firmware of gateway 616 may be remotely upgraded.

Referring now back to FIG. 7, The method described with reference to FIG. 7 may be implemented by components of system 100 described herein with reference to FIG. 2, and/or may be based on, combined with, and/or replaced with, features described with reference to FIG. 3-5 and/or 8-9. One or more decisions for management of the honeybee colony may be generated based on the outcome.

At 702, in-hive data is obtained by one or more internal sensors monitoring the honeybee colony.

At 704, external data is obtained by one or more external sensors monitoring the external environment of the honeybee colony.

At 706, the in-hive data and/or external data may represent raw data. The raw data may pre-processed to clean the raw data and/or remove outliers, optionally based on the biological understanding of the ecosystem and/or identified falsified samples.

At 708, features are extracted from the cleaned data.

Optionally, multiple levels of features are extracted. A first level of extracted features may be extracted, which are fed into ML models. Features may be, for example, engineered based on research and/or experiments. Exemplary first level features are described with reference to 710-714.

At 710, in-colony features (also referred to as hive feature) indicative of an internal state of the honeybee colony are extracted from the in-hive data. Exemplary in-colony features include: brood temperature, brood temperature variation, brood humidity, brood humidity variation, acoustic: frequency spectrum, acoustics: noise/power, and hive orientation.

At 712, out-colony features (also referred to as environment features) indicative of an external environment of the honeybee colony are extracted from the external data. Exemplary out-colony features include: ambient temperature, ambient temperature variation, rainfall, wind speed, crop variety, crop Density, forage availability, and forage bloom.

At 714, other features may be extracted from the in hive data and/or external data, and/or obtained from non-sensor sources such as from a user via a user interface (e.g., GUI). Exemplary other features include: agricultural data, crop biologic boundaries, bee—biologic boundaries, and queen lines.

A 716, the extracted features (e.g., first level, and/or as described with reference to 710-714) are fed into one or more trained ML models. The ML model(s) may generate a second level of more features, which may be more specific.

At 718, exemplary second level features are obtained as outcomes of the ML models, for example, 3 day timeframe: brood temperature (e.g., standard deviation, maximum, minimum, average, variance from ambient), humidity (e.g., standard deviation, maximum, minimum, average, variance from ambient), acoustics (e.g., peak noise 50 Hz, 100 Hz, 250 Hz, Sum of volume 50-100 Hz, 100-150 Hz, 200-200 Hz), and bloom stage (%).

At 720, the extracted features (e.g., first level, and/or as described with reference to 710-714, and/or second level and/or as described with reference to 718) are classified, by feeding into one or more ML models 722, for example, regression, support vector machine (SVM), naïve Bayes, K-nearest neighbors (KNN), neural network(s), and the like. The different ML models may be used to address multiple problems in different development stages. Each ML model may be used as an independent predictor to make predictions.

At 724, the outcomes of the ML models 722 may be analyzed, for example, using decision trees, to obtain a final output, optionally one or more indications of pollination effectiveness. Weights may be assigned to the outcome of the ML models (e.g., different weights for the different outcomes of the different ML models).

The decision tree(s) may combine statistical and/or biological knowledge to minimize the number of false positives. For example, a dead queen scenario that suddenly came to life is unlikely to happen. However, the colony may transition from a queen right state, to a queenless state, and back to the queen right state, for example, when the queen dies and is replaced by a new queen raised by the bees of the colony. The ML models may inspect such unlikely scenarios inspect before making a decision.

At 726, examples of indications of pollination effectiveness determined from the outcomes of the ML models 722 include: bee frames, foraging rate, pollination input, brood frames, queen status, pollination efficiency, foraging force, health status, and yield forecast.

At 728, the indications of pollination effectiveness are obtained.

At 730-732, optionally in parallel to 720 (e.g., simultaneously, before, and/or after 720-728) the extracted features (e.g., first level, and/or as described with reference to 710-714, and/or second level and/or as described with reference to 718) are analyzed to identify novelty deviation(s) and/or outlier deviations, i.e., anomalies.

Anomalies may be determined for, example:
- At a hive level. For example, when the hive has changed its internal behavior unexpectedly.
- At a yard (apiary) level. For example, when the hive suddenly behaves differently than other hives in the same location.
- At a region level. For example, when the hive's behavior is not aligned with a large number of hives in a specific region based on an index of normality. The index of normality may be computed, for example, by collecting historical data, and comparing to the historical data, for example, to the average of the historical data, a correlation function with a pattern of historical data over a time interval, and a standard deviation At 734-736, the identified novelty deviation(s) and/or outlier deviations are provided as output.

At 738, the outcomes of the indications of pollination effectiveness, the identified novelty deviation(s) and/or outlier deviations, are analyzed to arrive at a decision, which may be implemented manually and/or automatically. For example, to increase the number of bee hives, change the location of one or more bee hives, remove bee hives, and apply a medication to the bee hives. The year to year (or other interval, such as season to season) pollination strategy may change, for instance the hive density (e.g., per hectare) and/or distribution in crop may change, such as depending on what works best.

A major technical challenge is to communicate key metrics and/or insights about the complex pollination process in a way that is accessible, understandable, and which informs decision making. This is further complicated by the fact that there are at least two distinct end-user groups, i.e., referred to herein as "growers" and "beekeepers", which have different information needs and problems. The growers represent demand for beehives, by using the beehive(s) in order to improve pollination effectiveness for improving crop yields. The beekeepers represent supply of beehives, for providing the growers with a supply of bees for pollinating the crops.

The User Interface (e.g., graphical user interface (GUI)) is designed to address the unique challenges related to beekeeping, farming, and pollination management decision making processes. At least two platforms are provided within the User Interface to meet the needs of the 2 key end-user groups, i.e., a Beekeepers Platform (Supply), and a Growers Platform (Demand). Each User Interface is now described, optionally also indicating how the relevant ML models and/or indications of pollination efficiency (e.g., Bee Health and/or Pollination models) are used.

Referring now back to FIG. 8, user Interface 802 represents a Growers Platform designed to enables farmers to better manage the complex pollination process to maximize potential. Exemplary data obtained as outcomes of one or more ML models described herein, which may be presented in UI 802, include:

Pollination Planning: A Pollination Input ML model, for example as described herein, may calculates the optimum number of bee frames necessary to pollinate a given area of crop. The pollination input ML model may be a dynamic model that uses a combination of environmental, agronomic, and bee data to precisely assess every crop field's needs. Through the platform growers may order bees (e.g., bee frames) for every individual field/block on their farm, selecting the number of bees needed according to the recommendation provided. In addition drop maps can be used to notify the exact positioning of the hives in the field.

Quality Assurance: Hive availability and/or colony strength vary year to year, depending on winter mortality rates, weather, disease or pest outbreaks, etc. UI 802 is designed to provide growers with visibility, optionally in real time, of colony status (e.g., from when the growers contract with the beekeeper to when crop bloom starts), rather than only becoming aware of actual hive numbers and strengths when the hives are moved to the crop ready for pollination. The Bee Frame ML Model, for example as described herein, is designed to provide visibility on the strength of every hive in the supply chain and delivered to the crop.

Optimizing Pollination Efficacy: Once hives are deployed in the field, the Foraging Force and Rate ML models, for example as described herein, enable growers to track bee pollination activity of hives in real-time. In addition the Pollination Efficiency ML model, for example as described herein, provides indication of % pollination success, and ultimately provision of Yield Forecast.

For example, UI 802 may include one or more of the following:

Window 804 may present the average number of bee frames per acre, which may indicate real historical and/or current values, and/or predicted values such as for optimizing pollination effectiveness.

Window 806 may present a map indicating geographic locations of the deployed of the bee frames.

Window 808 may indicate pollination progress (%) over a season.

Window 810 may indicate pollination efficiency (%), for example, average pollination efficiency over a seasons (e.g., whole season), which may include real measured historical values, real measured current values, and/or future predicted values.

Referring now back to FIG. 9, user Interfaces 902-06 represents a Beekeeper Platform for presenting metrics and/or insights in a simple and/or informative way to help beekeepers manage large numbers (e.g., thousands, such as 100, or 1000, or 2000, or 5000, or other numbers) of beehives at multiple locations. Exemplary features of the Beekeeper Platform including presenting data obtained as outcomes of one or more ML models described herein, include:

Yard (apiary) View 902: Displays overall status of bee-yard clusters and/or provides an immediate indication of any issues and where resources need to be focused. The beekeepers may receive (e.g., instant) notifications for events (e.g., any type) that requires their intervention relating to Queen Status (e.g., colony queenless) and/or Hive Health (e.g., colony disorders) which may be outcomes of ML model(s) descried herein.

Yard Status Reports 906 and 908: Designed to provides more detail about hives' status at individual bee yards and/or assesses each bee yard's cost-effectiveness as an independent unit in the organization, for example, for allowing beekeepers to obtain real-time hive strength (e.g., outcomes of the Bee Frame and/or Brood Frame ML models) for every hive in the beehive network. Trends in hive strength over time may be presented.

The beekeeper platform may be developed, for example, as a mobile app for iOS and/or Android and/or as a web based platform.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant ML models will be developed and the scope of the term ML is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of training a machine learning model, comprising:
    computing at least one in-colony feature, computed based on output of at least one internal sensor monitoring the honeybee colony, wherein said at least one in-colony feature is indicative of an internal state of a sample honeybee colony positioned for pollination of at least one crop in a geographical area;
    computing at least one out-colony feature, computed based on output of at least one external sensor monitoring the environment of the honeybee colony, wherein said at least one out-colony feature is indicative of an external environment of the sample honeybee colony;
    creating a multi-record training dataset, wherein each record of the multi-record training dataset comprises:
    a combination of at least one in-colony feature and at least one out-colony feature, and
    a ground truth label indicating pollination effectiveness of the sample honeybee colony; and
    training a machine learning model on the multi-record training dataset.

2. The computer implemented method of claim 1, wherein the ground truth label comprises of a number of honeybees for delivery to the at least one crop for pollination thereof.

3. The computer implemented method of claim 1, wherein the ground truth label comprises a pollination efficiency of the sample honeybee colony.

4. The computer implemented method of claim 1, wherein the ground truth label comprises an indication of health of at least one hive that houses the sample honeybee colony.

5. The computer implemented method of claim 1, wherein the ground truth label comprises a status of a queen of the sample honeybee colony.

6. The computer implemented method of claim 1, wherein the ground truth label comprises an amount of brood.

7. The computer implemented method of claim 1, wherein the ground truth label comprises honeybee foraging activity determined according to forage available for crop pollination around a hive of the sample honeybee colony.

8. The computer implemented method of claim 7, wherein the forage available for crop pollination comprises a proportion of the at least one crop at a stage of crop bloom and/or a percentage of the at least one crop at crop bloom, wherein crop bloom comprises crop which is flowering and/or producing nectar and/or producing pollen.

9. The computer implemented method of claim 8, wherein the proportion of the at least one crop at a stage of crop bloom and/or a percentage of the at least one crop at crop bloom is computed by an image processing process that is fed images of the at least one crop captured by at least one camera.

10. The computer implemented method of claim 1, further comprising creating a plurality of multi-record training datasets, each multi-record training dataset includes a different set of records, wherein the machine learning model comprises an ensemble of machine learning models, and training comprises training the ensemble of machine learning models on the plurality of multi-record training datasets, and further comprising assigning weights to a plurality of outcomes of the ensemble of machine learning models, and providing an aggregation model that receives the weighted plurality of outcomes as input and generates a final prediction.

11. The computer implemented method of claim 10, wherein the ensemble of machine learning models generate outcomes selected from a group comprising:
    (i) bee frames indicating hive strength as expressed by a number of bee frames and/or an indication of growing and/or declining number,
    (ii) a number of brood frames and/or an indication of growing and/or declining number,
    (iii) queen status indicating presence of a laying queen in the colony,
    (iv) health status indicating presence of disease and/or infection and/or infestation,
    (v) pollination input indicating optimum number of bees and/or bee frames for pollinating the at least one crop,
    (vi) foraging force indicating total number of foraging trips delivered by the honeybee colony to the at least one crop,
    (vii) foraging rate indicating number of bees leaving the hive per time interval,
    (viii) pollination efficiency indicating proportion of the at least one crop successfully pollinated, and
    (ix) yield prediction indicating estimated nut/fruit set and/or yield.

12. The computer implemented method of claim 1, wherein the output of at least one internal sensor is selected from a group comprising: colony acoustics, brood temperature, and brood humidity; and wherein at least one external sensor is selected from a group comprising: camera, weather station, satellite image sensor, and data feeds.

13. The computer implemented method of claim 1, wherein the at least one in-colony feature of the honeybee colony is selected from group consisting of: colony strength, colony status, colony foraging activity, colony size, demography, presence of queen, brood status, brood temperature, brood variation, colony acoustics, acoustic frequency spectrum, acoustic noise/power, and hive orientation.

14. The computer implemented method of claim 1, wherein the at least one out-colony feature is selected from group consisting of: weather conditions, ambient temperature, ambient variation, crop density, crop variety, crop yield, forage availability, forage bloom, cover crops, field size, real time blood progress, forage availability, crop variety, temperature, wind speed, wind direction, rainfall, air pressure, ultraviolet (UV) light, and cloud cover.

15. The computer implemented method of claim 1, wherein the combination of the record includes at least one other feature obtained from a non-sensor source, selected from a group comprising: data entered by a user via a user interface, agricultural data, and queen lines.

16. The computer implemented method of claim 1, further monitoring the output of the at least one external sensor and/or the output of the at least one internal sensor over a time interval to obtain a plurality of values, and computing the at least one in-colony feature and/or the at least one out-colony feature as statistical features of the plurality of values.

17. The computer implemented method of claim 1, wherein the at least one internal sensor comprises:
    circuitry for wireless communication,
    an on-board power supply,
    at least one of: a temperature sensor for measuring temperature, a humidity sensor for measuring humidity, a stereo microphone for measuring colony acoustics, and a location sensor for sensing a location thereof, and
    a connector for connecting to a bee frame.

18. The computer implemented method of claim 17, wherein a plurality of internal sensors disposed within a plurality of bee frames are in wireless communication with a gateway in communication with a server.

19. The computer implemented method of claim 1, wherein the at least one internal sensor comprises a weather station disposed within an apiary that includes the hive of the sample honeybee colony, that monitors microclimate within and/or in proximity to the apiary, selected from a group comprising: temperature, wind speed, wind direction, and rainfall.

20. A computer implemented method of managing honeybee colonies for pollination of at least one crop, comprising:
- for each one of a plurality of honeybee colonies positioned for pollination of at least one crop in a geographical area:
  - obtaining at least one in-colony feature indicative of an internal state of the honeybee colony, computed based on output of at least one internal sensor monitoring the honeybee colony;
- obtaining at least one out-colony feature indicative of an external environment of the honeybee colony, computed based on output of at least one external sensor monitoring the environment of the honeybee colony;
  - feeding a combination of the at least one in-colony feature and the at least one out-colony feature into a machine learning model trained according to claim 1; and
  - obtaining an outcome indicating pollination effectiveness of the sample honeybee colony.

21. The computer implemented method of claim 20, wherein the machine learning model comprises an ensemble of machine learning models, and further comprising creating a plurality of combinations, feeding the plurality of combinations into the ensemble to obtain a plurality of outcomes, assigning weights to the plurality of outcomes, feeding the weighted plurality of outcomes into an aggregation model that generates the outcome as a final prediction.

22. The computer implemented method of claim 20, wherein the features of the method are iterated in near real time over a plurality of time intervals.

23. The computer implemented method of claim 20,
- wherein the pollination effectiveness comprises a predicted number of honeybees for delivery to the at least one crop for pollination thereof, and further comprising computing a current number of honeybees, and
- automatically generating instructions for ordering an additional number of honeybees for obtaining the current number when the current number is below the predicted number.

24. The computer implemented method of claim 20, further comprising analyzing the combination of the at least one in-colony feature and the at least one out-colony feature to identify whether an internal state has unexpectedly changed of a member of a group comprising: a hive relative to itself, a hive relative to other hives in the geographical location, and a hive relative to other hives in other geographical locations of a region.

25. The computer implemented method of claim 1, further comprising creating a plurality of multi-record training datasets, each multi-record training dataset includes a different set of records,
- wherein the machine learning model comprises an ensemble of machine learning models, and
- wherein training comprises:
  - training the ensemble of machine learning models on the plurality of multi-record training datasets, and
  - providing an aggregation model that receives the plurality of outcomes of the ensemble of the machine learning models as inputs and generates a final prediction.

26. A system for training a machine learning model, comprising:
- at least one processor executing a code for:
  - computing at least one in-colony feature, computed based on output of at least one internal sensor monitoring the honeybee colony, wherein said at least one in-colony feature is indicative of an internal state of a sample honeybee colony positioned for pollination of at least one crop in a geographical area;
  - computing at least one out-colony feature, computed based on output of at least one external sensor monitoring the environment of the honeybee colony, wherein said at least one out-colony feature is indicative of an external environment of the sample honeybee colony, from output of at least one external sensor monitoring the environment of the honeybee colony;
  - creating a multi-record training dataset, wherein each record of the multi-record training dataset comprises:
    - a combination of at least one in-colony feature and at least one out-colony feature, and
    - a ground truth label indicating pollination effectiveness of the sample honeybee colony; and
  - training a machine learning model on the multi-record training dataset.

\* \* \* \* \*